(12) United States Patent
Vos

(10) Patent No.: US 8,193,730 B2
(45) Date of Patent: Jun. 5, 2012

(54) DIMMER AND ILLUMINATION APPARATUS WITH AMPLITUDE ORDERED ILLUMINATION OF MULTIPLE STRINGS OF MULTIPLE COLOR LIGHT EMITTING DEVICES

(75) Inventor: Martin J. Vos, Minneapolis, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 385 days.

(21) Appl. No.: 12/638,206

(22) Filed: Dec. 15, 2009

(65) Prior Publication Data

US 2010/0090607 A1    Apr. 15, 2010

Related U.S. Application Data

(63) Continuation-in-part of application No. 12/137,667, filed on Jun. 12, 2008, now Pat. No. 7,863,831.

(51) Int. Cl.
*H05B 37/02* (2006.01)
(52) U.S. Cl. .................... 315/291; 315/209 R
(58) Field of Classification Search .............. 315/200 R, 315/207, 209 R, 224, 225, 291, 307
See application file for complete search history.

(56) References Cited

U.S. PATENT DOCUMENTS

| | | | |
|---|---|---|---|
| 3,984,778 A | 10/1976 | Bhopale | |
| 4,043,438 A | 8/1977 | Avant | |
| 4,689,548 A * | 8/1987 | Mechlenburg | 323/243 |
| 4,745,539 A * | 5/1988 | Nilssen | 363/37 |
| 6,175,195 B1 | 1/2001 | Janczak et al. | |
| 6,411,139 B1 | 6/2002 | Unterricker | |
| 6,625,424 B1 | 9/2003 | Mohindra | |
| 6,980,893 B2 | 12/2005 | Chiang | |
| 7,276,861 B1 * | 10/2007 | Shteynberg et al. | 315/291 |
| 2002/0158590 A1 * | 10/2002 | Saito et al. | 315/291 |
| 2006/0043941 A1 | 3/2006 | Fujii et al. | |

FOREIGN PATENT DOCUMENTS

| | | |
|---|---|---|
| CN | 1359255 | 7/2002 |
| EP | 0 325 301 A2 | 7/1989 |
| FR | 2 529 034 | 12/1983 |
| GB | 2 123 623 A | 6/1982 |
| JP | 59-122229 | 7/1984 |
| JP | 4-157086 | 5/1992 |
| JP | 7-59353 | 3/1995 |
| JP | 8-163875 | 6/1996 |
| JP | 2003-309973 | 10/2003 |
| WO | 02/05825 A1 | 1/2002 |

* cited by examiner

*Primary Examiner* — Jacob Y Choi
*Assistant Examiner* — Jimmy Vu

(57) ABSTRACT

A dimmer and an illumination apparatus are connected by a two wire circuit. The dimmer energizes the illumination apparatus and provides control of the illumination apparatus via the two wire circuit. The illumination apparatus receives all of its energization and control from the two wire circuit. Multiple strings of multiple color light emitting devices are switched on in a partitioned order during flank intervals of a switched AC power envelope on the two wire circuit.

20 Claims, 18 Drawing Sheets

DIMMER AND ILLUMINATION APPARATUS WITH AMPLITUDE ORDERED ILLUMINATION OF MULTIPLE STRINGS OF MULTIPLE COLOR LIGHT EMITTING DEVICES

CROSS-REFERENCE TO RELATED APPLICATION

The present application is a continuation-in-part of and claims priority of U.S. patent application Ser. No. 12/137,667, filed Jun. 12, 2008, now U.S. Pat. No. 7,863,831 the content of which is hereby incorporated by reference in its entirety.

BACKGROUND OF THE INVENTION

Various types of illumination apparatus are known such as incandescent bulbs, fluorescent bulbs and light emitting diode (LED) bulbs. LED bulbs are capable of efficient light generation, however the light generated is not ideally matched to illumination applications and not ideally matched to efficient energization from AC power mains. LEDs tend to produce Lambertian light beams rather than widely diffused illumination. LEDs tend to produce light in narrow spectral bands rather than broad spectrum white illumination. LEDs have DC operating voltages that are typically a few volts and can't be directly connected to AC mains power in the range of 100-250 volts. A method and apparatus are needed to better adapt LEDs for use in illumination applications.

SUMMARY OF THE INVENTION

Disclosed are a dimmer and an illumination apparatus. The dimmer and the illumination apparatus are connectable by a two wire circuit. According to one aspect, the dimmer energizes the illumination apparatus and provides control of the illumination apparatus via the two wire circuit. According to another aspect, the illumination apparatus receives all of its energization and control from the two wire circuit.

The dimmer comprises a rectifier. The rectifier is couplable to AC power. The rectifier provides a rectified power output.

The dimmer comprises a phase recovery circuit. The phase recovery circuitry comprises a comparison circuit. The comparison circuit compares the rectified power output to a threshold. The comparison circuit provides a comparison output that has a first level during a peak interval and a second level during flank intervals.

The phase recovery circuitry comprises phase control circuitry. The phase control circuitry generates a phase control output synchronized to the comparison output;

The dimmer comprises a timing circuit. The timing circuit receives the phase control output. The timing circuit actuates a dimmer switch circuit in amplitude order during the flank intervals in synchronization with the phase control output.

The dimmer comprises user setting inputs coupled to the timing circuit that control the dimmer switch actuation relative to the desired amplitude levels of the AC power signal during the flank intervals.

The illumination apparatus comprises a rectifier. The rectifier receives power from a switched AC power envelope. The rectifier provides a rectified power output. The rectified power output has a peak interval and flank intervals.

The illumination apparatus comprises a phase recovery circuit. The phase recovery circuit comprises a comparison circuit. The comparison circuit compares the rectified power output to a threshold. The comparison circuit provides a comparison output that has a first level during the peak interval and a second level during the flank intervals.

The phase recovery circuit comprises phase control circuitry. The phase control circuitry generates a phase control output that is synchronized to the comparison output.

The illumination apparatus comprises a timing circuit. The timing circuit receives the phase control output. The timing circuit actuates multiple switches in amplitude order during the flank intervals in synchronization with the phase control output.

The illumination apparatus comprises multiple strings of multiple color light emitting devices coupled through the multiple switches to the rectified power output.

DETAILED DESCRIPTION OF ILLUSTRATIVE EMBODIMENTS

In the embodiments described below, a dimmer provides a dimmer output that comprises a switched AC power envelope that includes peak ON pulses at peaks of the AC power. The switched AC power envelope also includes flank ON pulses that have pulse widths that are set by user inputs to control dimming. The switched AC power envelope is therefore not a complete sine wave and includes multiple time intervals between ON pulses when the amplitude is zero or near zero. The dimmer output energizes an illumination apparatus by way of a two wire circuit.

The illumination apparatus includes multiple series strings of light emitting devices of different colors. A first flank ON pulse that starts at a first selected phase time energizes one series string of light emitting devices of a first color. A second flank ON pulse that starts at a second selected phase energizes a second series string of light emitting devices of a second color. Additional flank ON pulses can be provided for additional colors. The perceived intensity and chromaticity of light produced by the illumination apparatus is controlled by the user phase settings of the flank ON pulses. The peak ON pulses energizes a DC power supply circuit in the illumination apparatus.

There is a need for a reliable and stable recovery of an AC phase reference in the illumination apparatus for controlling application of power to the series strings of light emitting devices. Phase reference circuitry that utilizes a phase lock loops that is triggered by zero crossings of the AC power require complicated circuits to avoid inadvertent triggering by zero levels or near zero levels between ON pulses. In the embodiments described below, the use of phase lock loops is avoided, and a phase reference is derived from peak ON pulses rather than zero crossings. Derivation of a phase reference from peak ON pulses provides a reliable and stable recovery of an AC phase reference.

Figure 1:
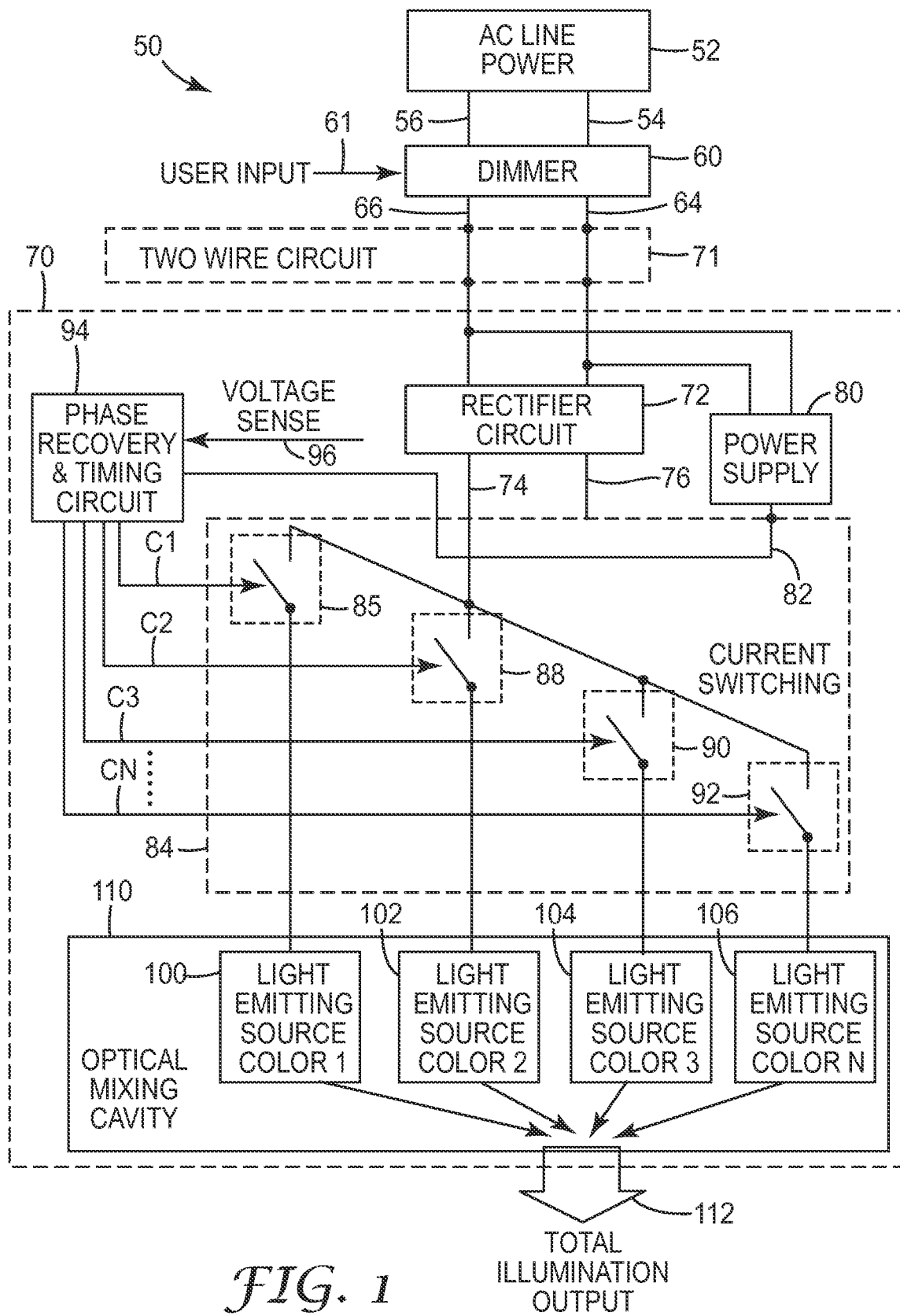
FIG. 1 illustrates a block diagram of an illumination system.

FIG. 1 illustrates a block diagram of an illumination system 50. The illumination system 50 is energized by AC power from an AC power line 52. The AC power line 52 provides AC power on two conductors 54, 56 from an AC power distribution panel or any other known source of AC power. According to one aspect, the AC power comprises 50 Hz or 60 Hz sine wave AC power. According to another aspect, one of the two AC power conductors 54, 56 is optionally grounded. The AC power provided, from time to time, includes line voltage variations and noise.

The illumination system 50 includes a circuit 60 that is referred to here as an "RGB dimmer" 60. The term "RGB" refers to different colors emitted in the visual spectrum, for example red, green and blue. Colors other than red, green and blue can be used as well. The RGB dimmer 60 is connected to AC power conductors 54, 56 and is energized by AC power conductors 54, 56. The circuitry of the RGB dimmer 60 is described in more detail below by way of example schematics illustrated in FIGS. 2, 4 and 7 and an example timing dimmer output waveform illustrated in FIG. 5. The RGB dimmer 60 provides a switched AC power envelope on lines 64, 66. The switched AC power envelope on lines 64, 66 comprises a waveform that is switched on and off within a sinusoidal AC envelope as described below in connection with FIG. 5. The on and off switching of the switched AC power envelope on lines 64, 66 is controlled as a function of an amplitude of the AC power provided on AC power conductors 54, 56 as described below in connection with the example circuits illustrated in FIGS. 7, 10-12, 14, 15. The on and off switching of the switched AC power envelope on lines 64, 66, in addition to providing power, also provides certain color lamp actuation interval information in the switching which is explained in more detail below. According to one aspect, a user input 61 is provided on the RGB dimmer 60 to permit a user to adjust brightness or color of light emitted by an "RGB bulb" circuit 70.

The illumination system 50 includes the illumination apparatus 70, also called an "RGB bulb". The illumination apparatus 70 is connected to the switched AC power envelope on lines 64, 66. The illumination apparatus 70 is energized exclusively from the lines 64, 66. The lines 64, 66 are connected to the illumination apparatus 70 by a two wire circuit 71. The two wire circuit 71 includes the two current carrying conductors 64, 66 which carry both energization (power) and amplitude information to the RGB bulb circuit 70.

According to one aspect, the illumination apparatus 70 comprises a bulb with a screw contact base that fits into a bulb socket in a lamp base (such as an Edison socket), and the two wire circuit 71 comprises an ordinary lamp cord that connects to the bulb socket and that plugs into an ordinary electric outlet or the RGB dimmer 60. According to another aspect, the conductors 54, 56 comprise a lamp cord that plugs into an ordinary electrical outlet of the AC power line 52. It is understood by those skilled in the art that the lamp cords optionally include safety grounding conductors that are not energized and that do not carry energization currents under normal conditions. According to yet another aspect, the illumination apparatus comprises a light fixture.

The illumination apparatus 70 comprises a rectifier circuit 72 that couples to the lines 64, 66. The rectifier circuit 72 rectifies the switched AC power envelope on lines 64, 66 and provides a rectified power output on lines 74, 76 that is full wave rectified. The on and off switching that is present on lines 64, 66 is also present in rectified form in the rectified power output on lines 74, 76.

The illumination apparatus 70 comprises a low voltage power supply 80. The power supply 80 is energized by the full wave output on lines 64, 66. The power supply 80 provides low voltage DC power (typically 5-15 volts DC or other logic level voltage) on line 82 for energizing switch circuits 84 and a phase recovery and timing circuit 94. The illumination apparatus 70 comprises the switch circuit 84 and the phase recovery and timing circuit 94. The switching circuit 84 comprises solid state switches 85, 88, 90, 92. Line 82 couples to switching circuit 84 to provide DC energization for the switches 85, 88, 90, 92.

The phase recovery and timing circuit 94 senses AC power voltage on line 96. The line 96 of the phase recovery and timing circuit 94 senses rectified AC power voltage at conductors 74, 76. The phase recovery and timing circuit 94 derives amplitude information from the amplitude of the switched AC power envelope on line 96. The phase recovery and timing circuit 94 provides logic level switch control outputs C1, C2, C3, . . . , CN respectively to control inputs of the switches 85, 88, 90, 92 as illustrated. The switching of the logic level switch control outputs C1, C2, C3, . . . CN is controlled as a function of the sensed amplitude on line 96. According to one aspect, the logic level switch control outputs C1, C2, C3, . . . , CN are on during non-overlapping amplitude intervals such that only one control output C1, C2, C3, . . . , CN is on at a time. The logic level control outputs are on in amplitude order.

The illumination apparatus 70 comprises light emitting sources 100, 102, 104, 106. Each such light emitting source in RGB bulb circuit 70 comprises a series circuit (string) of multiple light emitting devices. The light emitting devices can be light emitting diodes (LEDs) including organic LEDs (OLEDs), or other color light emitting devices that operate at low voltages such as less than a few volts. Various types of low voltage color electroluminescent devices can be used. The light emitting sources 100, 102, 104, 106 are energized (turned on) in amplitude order during non-overlapping amplitude intervals. Rectified power on line 74 is connected through switches 85, 88, 90, 92 to light emitting sources 100, 102, 104, 106 under the control of switch control outputs C1, C2, C3, . . . , CN as illustrated. Each of the light emitting sources 100, 102, 104, 106 emits light in a different portion of the visible spectrum and is turned on at a different time with respect to another light emitting source.

Light emitted by the light emitting sources 100, 102, 104, 106 is injected into an optical mixing cavity 110. The optical mixing cavity 110 manages the light emitted into a total illumination output 112. The managing of the emitted light comprising directing the emitted light from the multiple strings similarly so that a uniform mixture of the multiple colors is provided for substantially all directions of illumination outputs. There is a common output illumination path for the multiple colors. The managing of emitted light avoids distracting color fringes due to non-uniform mixing. According to one aspect, the optical cavity 110 comprises one or more light diffusers. According to another aspect, the total illumination output 112, as viewed from a particular viewing angle or direction, includes R, G and B light emitted from all of the light emitting sources 100, 102, 104, 106. According to another aspect, the optical cavity 110 has a shape like a light bulb, and the electronic circuitry in illumination apparatus 70 is inside the light bulb shape of optical cavity 110.

According to one aspect, the illumination apparatus 70 comprises a red (R) light emitting source, a green (G) light emitting source and a blue (B) light emitting source. During each half cycle of the AC power, the color sequence B-R-G-G-R-B is emitted. During each full cycle of the AC power, the color sequence B-R-G-G-R-B-B-R-G-G-R-B is emitted. The persistence of vision in humans is long enough so that the color sequence R-G-B-R-G-B during a full cycle of 50 or 60 Hz power is perceived as a mixture of the colors R, G, B, even though there is no simultaneous emission of the colors R, G, B. According to this aspect, the illumination apparatus 70 provides illumination that is perceived as illumination with a color in the range of white illumination. According to one aspect, the repetition frequency of the color sequence is high enough to exceed a critical flicker frequency according to the Talbot-Plateau law. According to another aspect the repetition frequency of the color sequence is high enough to exceed a critical chromatic flicker frequency, usually lower than the critical flicker frequency.

Figure 2:
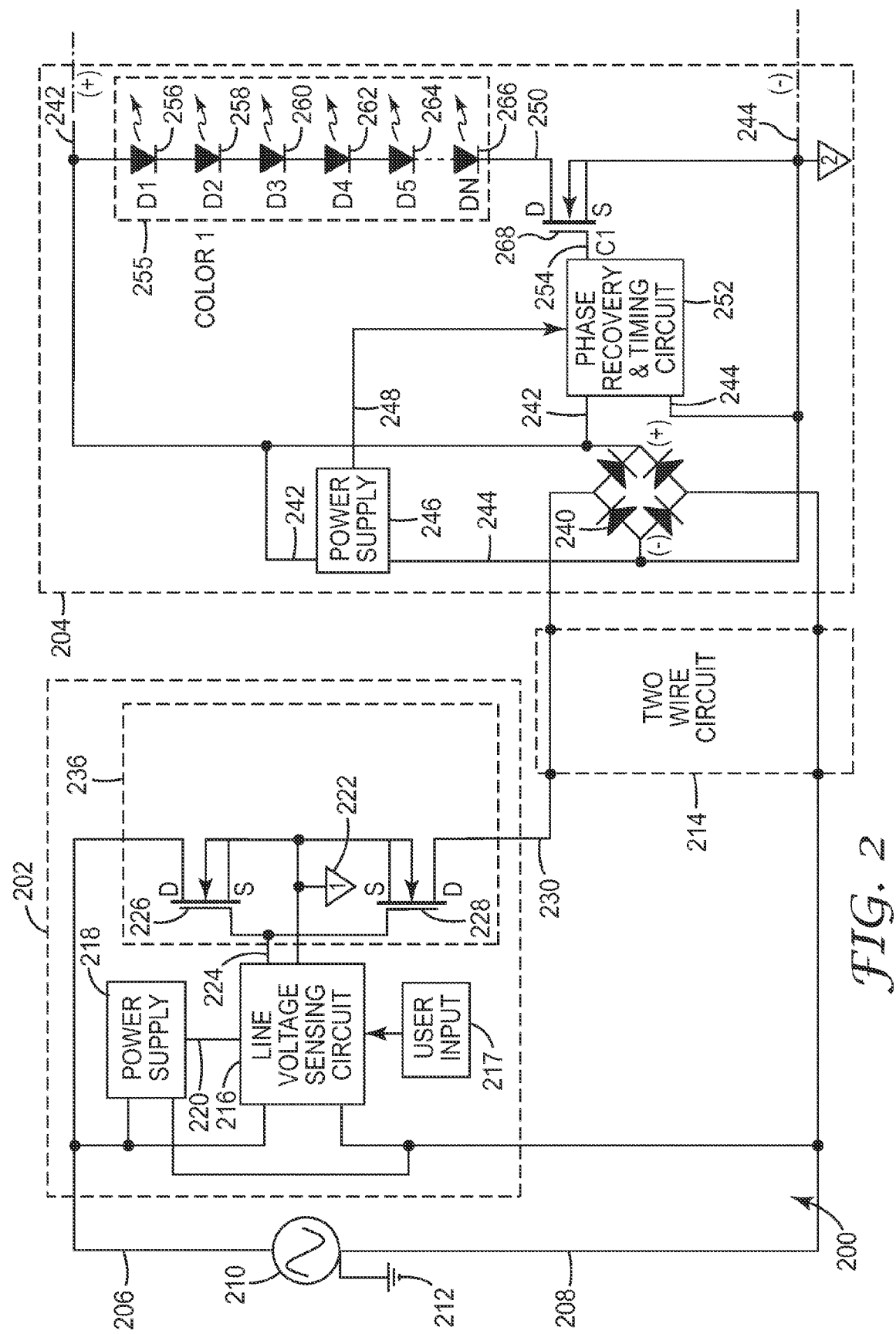
FIGS. 2-3 illustrate a schematic diagram of an illumination system.
Figure 3:
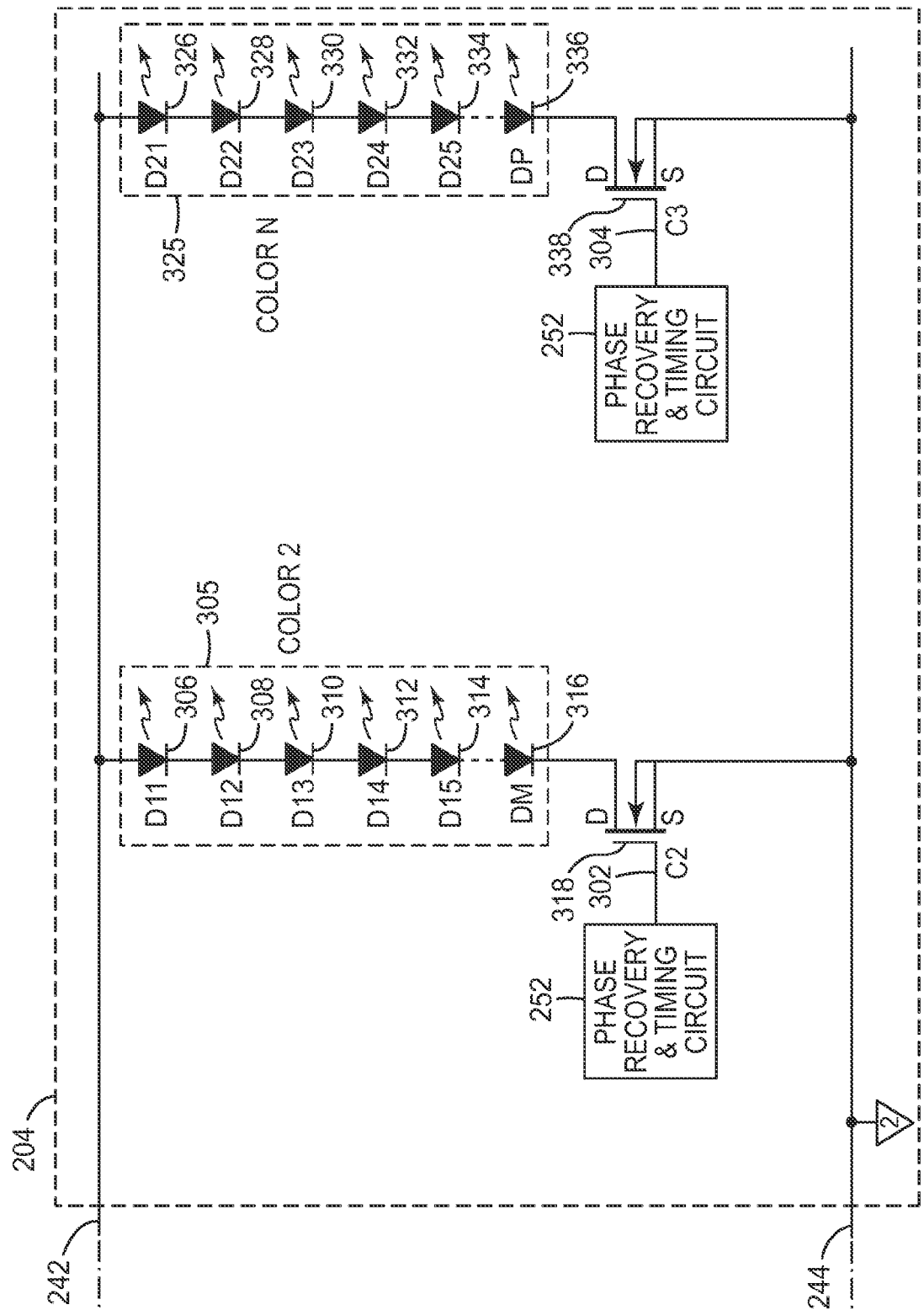

FIG. 2 illustrates a first partial schematic diagram of an illumination system 200. The illumination system 200 comprises a dimmer 202 and an illumination apparatus 204. Only a partial schematic of the illumination apparatus 204 is illustrated in FIG. 2, and remaining portions of the schematic of the illumination apparatus 204 are shown in FIG. 3. A complete schematic of the illumination system 200 can be seen by arranging FIG. 2 on a left side of FIG. 3. The dimmer 202 is energized by AC power on conductors 206, 208 that are connected to an AC power line 210.

According to one aspect, conductor 208 is optionally connected through AC power line 210 to an earth ground 212 and comprises a grounded conductor. The grounded conductor 208 extends through a two wire circuit 214 to the illumination apparatus 204.

The dimmer 202 comprises a line voltage sensing circuit 216. The line voltage sensing circuit 216 senses phase information of line voltage at conductors 206, 208. According to one aspect, the line voltage sensing circuit 216 comprises a user input 217 for adjustment of voltage amplitude levels for switching, which are described in more detail below in FIG. 5. According to one aspect, the line voltage sensing circuit comprises a bridge rectifier and the circuitry shown in FIG. 7.

The dimmer 202 comprises a low voltage power supply 218. The power supply 218 is energized by the line voltage at conductors 206, 208. The power supply 218 generates a logic level DC supply voltage (such as 5-15 volts, for example) between a conductor 220 and a reference conductor 1 (also called DC common 1) 222. The logic level DC supply voltage is coupled to the line voltage sensing circuit 216 and energizes the line voltage sensing circuit 216. The line voltage sensing circuit 216 generates a switch control output 224.

The dimmer 202 comprises a first MOSFET transistor 226 and a second MOSFET transistor 228. The switch control output 224 couples to input gates of the first and second MOSFET transistors 226, 228. According to one aspect, both transistors 226, 228 are N-channel depletion mode MOSFETs. Each of the MOSFET transistors 226, 228 comprises a source (S) that is connected to the reference 1 conductor 222. The MOSFET transistor 226 has a drain (D) that is connected to AC power conductor 206. The MOSFET transistor 228 has a drain (D) that is connected to a conductor 230 that couples to the RGB bulb 204 by way of the two wire circuit 214. It will be understood by those skilled in the art that the MOSFET transistors 226, 228, when reverse biased, have an internal structure (e.g., connection of the transistor source (S) to the transistor substrate) that functions as a rectifier diode between drain (D) and source (S) such that the MOSFET transistors 226, 228 conduct current when reverse biased. The MOSFET transistors 226, 228 are not damaged by reverse bias currents. When both MOSFET transistors 226, 228 are OFF, there is no current flow through the MOSFET transistors 226, 228. When both MOSFET transistors 226, 228 are ON, current of both polarities can flow through first and second MOSFET transistor 226, 228. The circuit arrangement of the first and second MOSFET transistors 226, 228 functions as a solid state AC switch 236. This AC switch 236 does not latch until a zero current crossing like an SCR or TRIAC would. The AC switch 236 does not require a zero current crossover for commutation. This AC switch 236 can be used to switch line voltage (e.g., 117 VAC or 234 VAC) circuits ON and OFF without latch up. As a result, the ON/OFF switching remains controllable at any amplitude of the sinewave AC power.

The conductors 230, 208 form the two wire circuit 214 that supplies energy to the illumination apparatus 204. The conductor 208 can be optionally grounded at ground 212 and can include an outer metal screw base shell inside a lamp socket into which the illumination apparatus 204 is installed.

The illumination apparatus comprises a full wave bridge rectifier 240. The bridge rectifier 240 receives AC energization on conductors 208, 230 and provides rectified energization on conductors 242, 244. The rectified energization on conductors 242, 244 is coupled to a power supply 246. The power supply 246 generates logic level (e.g., 5-15 volt) DC voltage on conductor 248 referenced to conductor reference 2 (also called DC common 2) 244. The local conductor reference 2 at 244 in the RGB bulb 204 is not the same as the local conductor reference 1 at 222 in the RGB dimmer 202.

The illumination apparatus 204 comprises a phase recovery and timing circuit 252. The phase recovery and timing circuit 252 is energized by the power supply 246. The phase recovery and timing circuit 252 senses the amplitude of the rectified voltage on conductors 242, 244. The phase recovery and timing circuit 252 provides a switch control output C1 at 254. The operation of the phase recovery and timing circuit 252 is described in more detail below in connection with FIGS. 7 and 16.

The illumination apparatus 204 comprises a first series circuit 255 comprising light emitting diodes 256, 258, 260, 262, 264, 266 which emit light of a first color (COLOR 1). An n-channel, depletion mode MOSFET transistor 268 comprises a drain (D) and a source (S) connected in series with the first series circuit 255. A gate of the MOSFET transistor 268 receives the switch control output C1 at 254. It will be understood by those skilled in the art that series circuits of LED's (such as first series circuit 255) typically include a certain number (M, N and P) of LED's consistent with the actual voltage amplitude window when the series string is switched ON.

Only a partial schematic of the RGB bulb 204 is illustrated in FIG. 2. A right edge of FIG. 2 can be positioned adjacent a left edge of FIG. 3 to form a complete schematic diagram. Conductors (lines) 242, 244 extend from FIG. 2 to FIG. 3. Additional portions of the phase recovery and timing circuit 252 in FIG. 2 are shown in duplicate in FIG. 3 for clarity. As illustrated in FIG. 3, the phase recovery and timing circuit 252 generates switch control output C2 at 302 and switch control output C3 at 304.

The illumination apparatus 204 comprises a second series circuit 305 comprising light emitting diodes 306, 308, 310, 312, 314, 316 which emit light of a second color (COLOR 2). An n-channel, depletion mode MOSFET transistor 318 comprises a drain (D) and a source (S) connected in series with the second series circuit 305. A gate of the MOSFET transistor 318 receives the switch control output C2 at 302.

The illumination apparatus 204 comprises a third series circuit 325 comprising light emitting diodes 326, 328, 330, 332, 334, 336 which emit light of a third color (COLOR 3). An n-channel, depletion mode MOSFET transistor 338 comprises a drain (D) and a source (S) connected in series with the third series circuit 325. A gate of the MOSFET transistor 338 receives the switch control output C3 at 304.

The three colors COLOR 1, COLOR 2, COLOR 3 are different from one another, and each of the three colors can be turned ON for selected amplitude windows to produce a desired perception of a visible color of illumination. The three colors COLOR 1, COLOR 2, COLOR 3 are produced in an optical mixing cavity.

Figure 4:
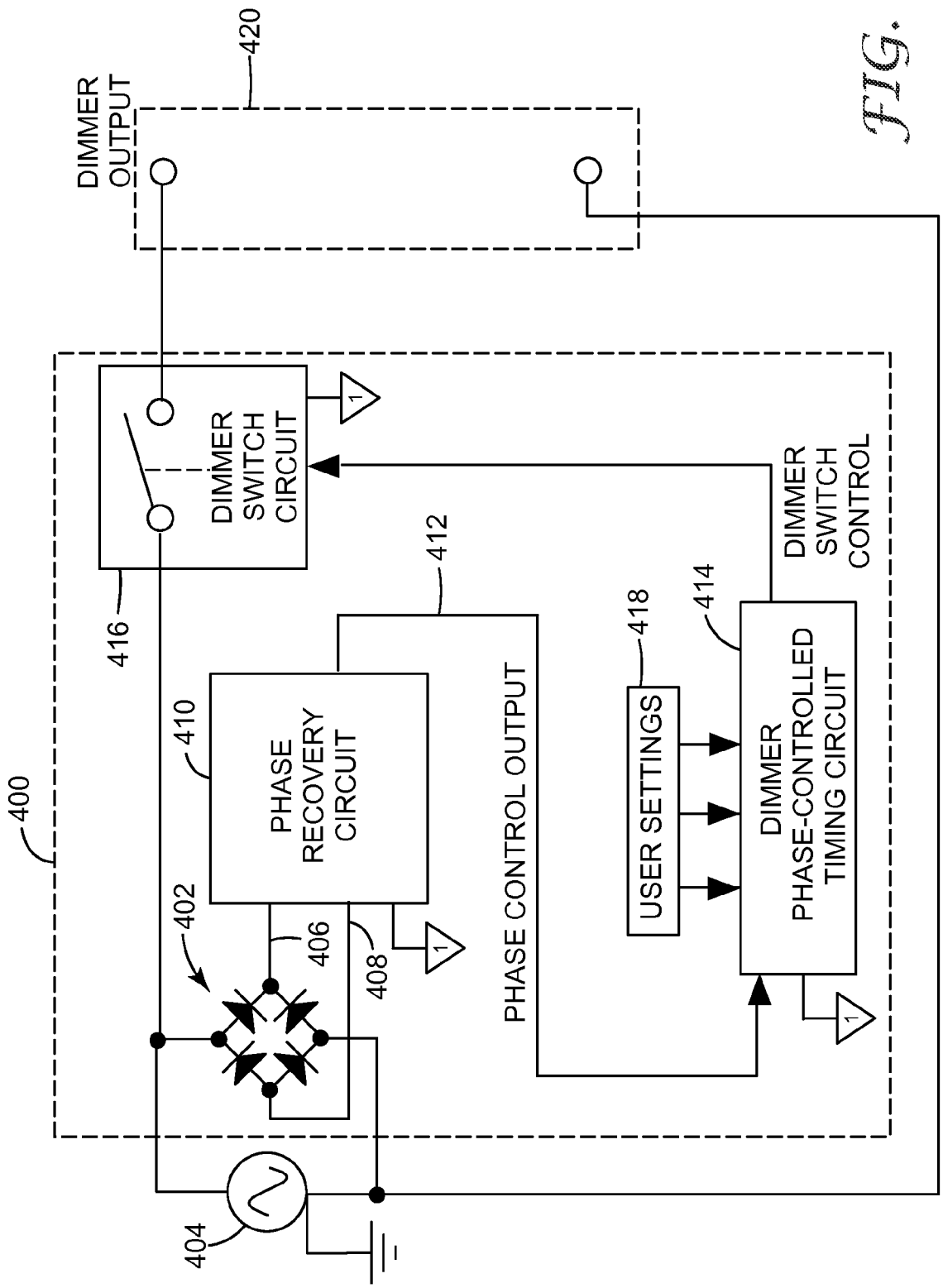
FIG. 4 illustrates a block diagram of a dimmer.

FIG. 4 illustrates a block diagram of a dimmer 400. The dimmer 400 comprises a rectifier 402. The rectifier 402 is coupled to AC power 404. The rectifier 402 provides a rectified power output on lines 406, 408. The dimmer 400 comprises a phase recovery circuit 410. According to one aspect, the phase recovery circuit comprises the circuitry described in more detail below in connection with examples shown in FIGS. 7-8, 10-15.

Figure 10:
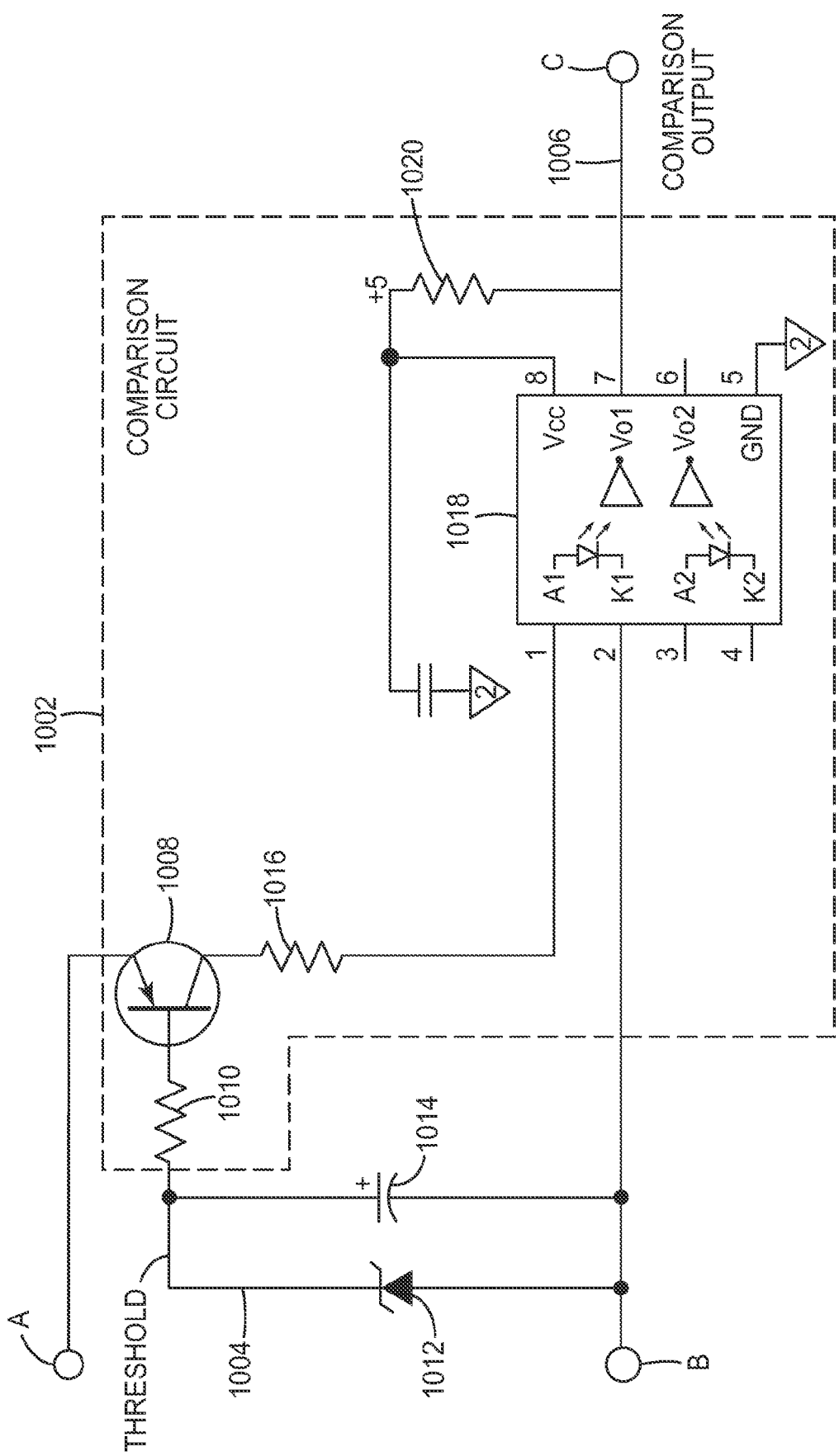
FIG. 10 illustrates a schematic diagram of a threshold and comparator circuit.

As illustrated in FIG. 10, an example of the phase recovery circuit 410 comprises an exemplary comparison circuit 1002 that compares the rectified power output on lines 406, 408 (nodes A and B in FIG. 10) to a threshold 1004 (FIG. 10). The comparison circuit 1002 provides a comparison output 1006 (node C in FIG. 10). As illustrated in a timing diagram in FIG. 13, the comparison output 1006 (node C in FIG. 13) has a first level 1302 during a peak interval and a second level 1304 during flank intervals.

Figure 7:
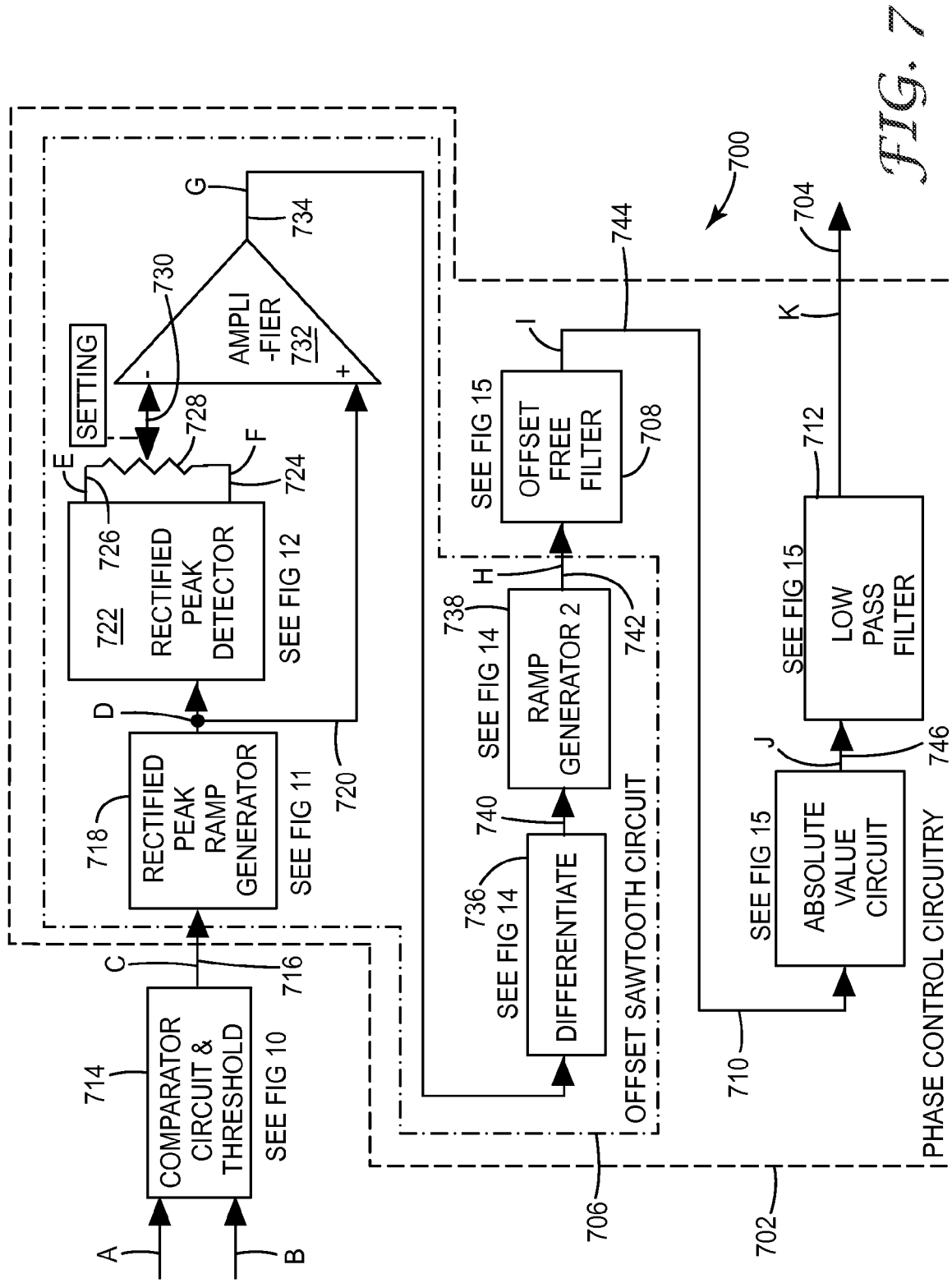
FIG. 7 illustrates a block diagram of a phase recovery circuit.

As illustrated in FIG. 7, an example of the phase recovery circuit 410 comprises exemplary phase control circuitry 702 that generates a phase control output 704 (node K in FIGS. 7 and 15), also called phase control output 412 in FIG. 4. The phase control output 704 is synchronized to the comparison output 1006. According to one aspect, the phase control output 412 comprises a triangular waveform (as shown at node K in FIG. 8) that has an amplitude representative of an absolute value of the AC power envelope.

As illustrated in FIG. 4, a timing circuit 414 receives the phase control output 412. The timing circuit 414 actuates a dimmer switch circuit 416 in a sequence during the sine wave period in synchronization with the phase control output 412. According to one aspect, the dimmer switch circuit 416 comprises a solid state switch circuit such as circuit 236 described above in connection with FIG. 2.

User setting inputs 418 are coupled to the timing circuit 414. The user setting inputs 418 controls actuation of the dimmer switch circuit 416 during the flank intervals. The actuation of the dimmer switch circuit 416 during flank intervals generates a switched AC power envelope as described below in connection with FIG. 5. According one aspect, the user settings 418 adjust light color settings in an illumination apparatus that is energized by the dimmer 400.

Figure 8:
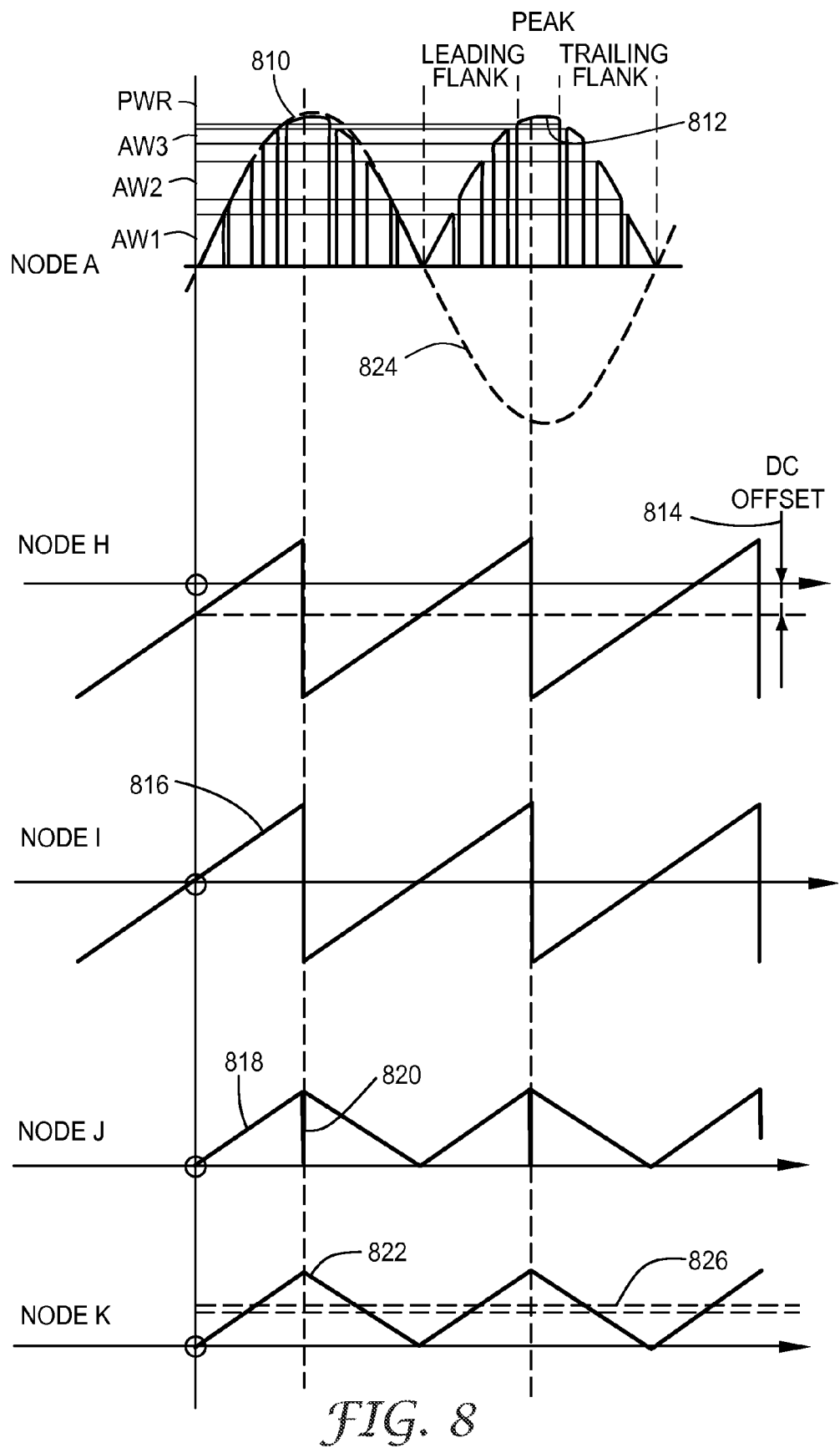
FIG. 8 illustrates a timing diagram of the phase recovery circuit of FIG. 7.

According to another aspect illustrated in FIGS. 7, 8, the phase recovery circuit 410 comprises an offset sawtooth circuit 706 (FIG. 7) that receives the rectified power output (nodes A in FIGS. 7, 8) and that generates an offset sawtooth voltage that comprises a DC offset (node H, FIGS. 7, 8). The phase recovery circuit 410 comprises an offset-free filter 708 (FIG. 7) that receives the offset sawtooth voltage (node H in FIGS. 7, 8) and that generates an offset-free sawtooth voltage (node I in FIGS. 7, 8). The phase recovery circuit 410 comprises an absolute value circuit 710 that receives the offset-free sawtooth voltage (node I, FIGS. 7, 8) and that generates a triangular absolute value voltage (node J, FIGS. 7, 8). The phase recovery circuit 410 comprises a low pass filter 712 (FIG. 7) that receives the triangular absolute value voltage (node J, FIGS. 7, 8) and that provides the phase control output 704 (node K, FIGS. 7 and 8).

According to one aspect illustrated in FIG. 4, the dimmer 400 comprises a dimmer output 420 comprising a two wire circuit. The two wire circuit 420 provides a switched AC power envelope furnishing both energization and information to an illumination apparatus (not illustrated in FIG. 4).

Figure 5:
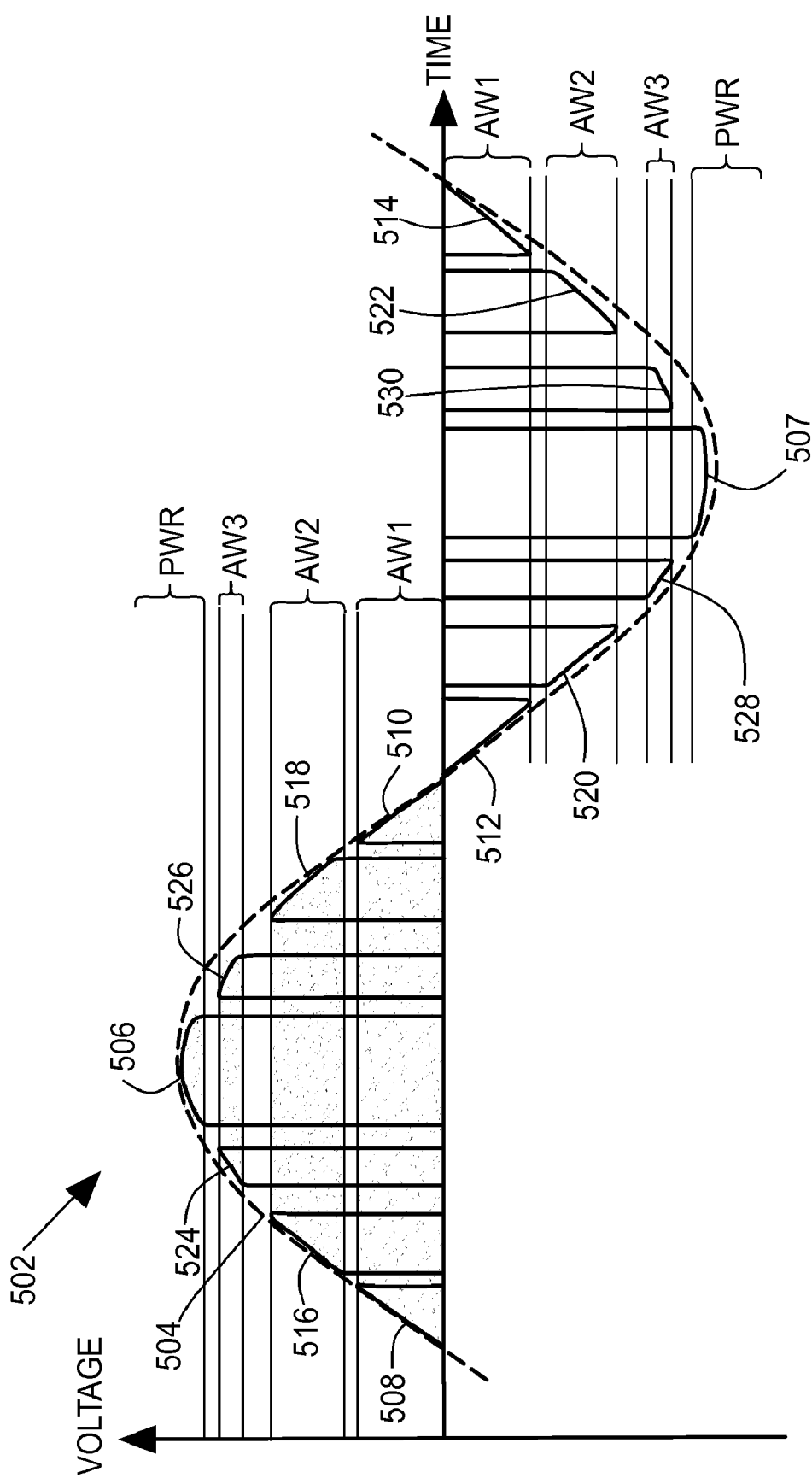
FIG. 5 illustrates an exemplary voltage output waveform of the dimmer in FIG. 4.

FIG. 5 illustrates an example voltage output waveform 502 of the dimmer in FIG. 4. The voltage output waveform comprises a switched AC power envelope 502 as illustrated. The switched AC power envelope 502 is synchronized with AC power 504 (indicated by a broken line sine wave). The AC power envelope 502 comprises leading flank intervals, peak intervals and trailing flank intervals as illustrated. During peak intervals, the AC power envelope 502 comprises pulses 506, 507 of approximately fixed duration. According to one aspect, the pulses 506, 507 are utilized by an illumination apparatus for energizing a power supply, such as power supply 602 in FIG. 6).

Intervals 508, 510, 512, 514 are provided for energizing a first color (color 1) string of color light emitting devices in an illumination apparatus. The pulses 508, 510, 512, 514 have a common amplitude AW1 that is controlled by a first color user setting (one of user settings 418 in FIG. 4). The window AW1 controls an amplitude window in which color 1 is energized and thus controls the brightness of color 1 in the illumination device. There are a total of four (4) ON windows of color 1 during each complete cycle of the AC power 504 which reduces any perception of flicker in color 1. In like fashion, pulses 516, 518, 520, 522 are provided for a color 2 with a common AW2 controlled by a second user setting, and pulses 524, 526, 528, 530 are provided for a color 3 with a common AW3 controlled by a third user setting. The user settings 418 are thus able to control both hue and brightness of lighting in an illumination apparatus using only a two wire circuit for connection.

Figure 6:
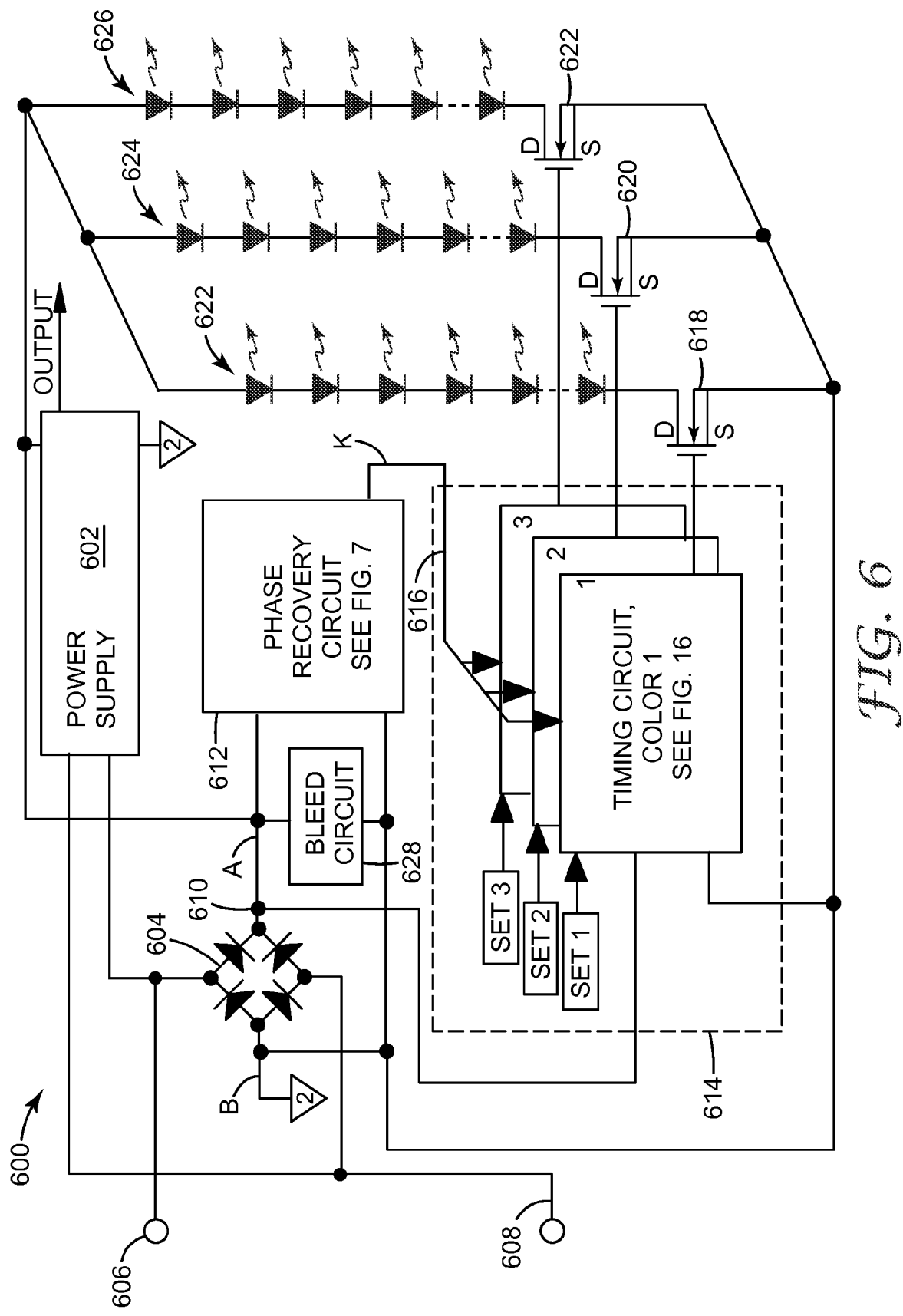
FIG. 6 illustrates a diagram of an illumination apparatus.

FIG. 6 illustrates a diagram of an exemplary illumination apparatus 600. The illumination apparatus illumination 600 comprises a rectifier 604. The rectifier 604 receives power from a switched AC power envelope, such as that shown in FIG. 5, at contacts 606, 608. The rectifier 604 provides a rectified power output 610 that has a peak interval and flank intervals as described in connection with FIG. 5.

The illumination apparatus 600 comprises a phase recovery circuit 612 which is described in more detail below in connection with FIG. 7. The illumination apparatus 600 comprises a timing circuit 614 that is described in more detail below in connection with FIG. 7. The timing circuit 614 receives a phase control output 616. The timing circuit 614 actuates multiple switches 618, 620, 622 in order during the flank intervals (as shown in FIG. 5) in synchronization with the phase control output 616.

The illumination apparatus 600 comprises multiple strings 622, 624, 626 of multiple color light emitting devices coupled through the multiple switches 618, 620, 622 to the rectified power output 610.

According to one aspect, the phase control output 616 comprises a triangular waveform (as shown at node K, FIG. 8) that has an amplitude representative of an absolute value of the AC power envelope, such as envelope 504 in FIG. 5. According to another aspect, each of the multiple strings 622, 624, 626 of color light emitting devices has a voltage drop that corresponds with absolute values of the AC power envelope during the flank intervals in which each of the multiple strings string is energized. The number of color light emitting devices in each string is selected to provide the desired voltage drop. According to another aspect, the multiple switches 618, 620, 622 comprise current limiting switches. According to another aspect, an optical mixing cavity (such as cavity 110 in FIG. 1) directs light received from the multiple strings 622, 624, 626 and provides a mixed illumination output (such as illumination output 112 in FIG. 1).

The illumination apparatus 600 comprises a bleed circuit 628 coupled to the rectified power output 610. The bleed circuit 628 is described in more detail below in connection with FIG. 9. The illumination apparatus comprises the power supply 602. The power supply 602 is energized by the power provided by 606 & 608. The power supply 602 provides DC power to the phase recovery circuit 612 and the switch circuit 614.

FIG. 7 illustrates a block diagram of an exemplary phase recovery circuit 700. Various circuit nodes in FIG. 6 are identified as nodes A, B, C, D, E, F, G, H, I, J and K. These nodes are also identified in schematics and timing diagrams in FIGS. 8-16 for convenience in relating FIG. 7 to the schematics and timing diagrams. One instance of the phase recovery circuit 700 is used in the dimmer 400 as a phase recovery circuit 410 (FIG. 4). One instance of the phase recovery circuit 700 is used in the illumination apparatus 600 as the phase recover circuit 612.

The phase recovery circuit 700 comprises a comparator and threshold circuit 714. The comparator and threshold circuit 714 is described in more detail below in connection with FIG. 10. The comparator and threshold circuit senses to the rectified power output (610 in FIG. 6, nodes A & B). The comparator provides a comparator output 716 at node C. The phase recovery circuit 700 comprises phase control circuitry 702.

The phase control circuitry 702 comprises a rectified peak ramp generator 718. The rectified peak ramp generator 718 is described in more detail below in connection with FIG. 11. The rectified peak ramp generator senses the comparator output 716 at node C and provides a ramp generator output 720 at node D.

The phase control circuitry 702 comprises a rectified peak detector 722. The rectified peak detector 722 is described in more detail below in connection with FIG. 12. The rectified peak detector senses the ramp generator output 720 at node D. the rectified peak detector 722 provides a rectified peak detector output at 724, 726 (nodes E and F). The rectified peak detector output at 724, 726 connects to a potentiometer 728. The potentiometer 728 is adjustable and has an adjustable output 730 that couples to an amplifier 732. The ramp generator output 720 couples to the amplifier 732. The amplifier 732 compares the adjustable output 730 to the ramp generator output 720. The amplifier 732 provides an amplifier output 734 at node G.

The phase control circuitry 702 comprises a differentiator 736 and a second ramp generator 738. The differentiator 736 and the second ramp generator 738 are described in more detail below in connection with FIG. 14. The differentiator 736 receives the amplifier output 734 and provides a differentiator output 740 to the second ramp generator 738. The second ramp generator 738 provides a ramp generator 2 output 742 at node H.

The rectified peak ramp generator 718, the rectified peak detector 722, the potentiometer 728, the amplifier 732, the differentiator 736 and the second ramp generator 738, taken together comprise the offset sawtooth circuit 706.

The phase control circuitry 702 comprises the offset free filter 708, the absolute value circuit 710 and the low pass filter 712. The offset free filter 708, the absolute value circuit 710 and the low pass filter 712 are described in more detail below in connection with FIG. 15. The offset free filter 708 receives the ramp generator 2 output 742 at node H. The offset free filter 708 provides an offset free output 744 at node I. The offset free output 744 at node I is also called a DC free output. The absolute value circuit 710 receives the offset free output at node I and provides an absolute value output 746 at node J. The low pass filter 712 receives the absolute value output 746 at node J and provides a low pass filter output 704 at node K. The low pass filter output 704 at node K is also called the phase control output 704.

FIG. 8 illustrates an exemplary timing diagram of the phase recovery circuit 700 of FIG. 7. The timing diagram schematically indicates voltages at nodes A, H, I, J and K in the phase recovery circuit 700. According to one aspect, the voltages at nodes H, I, J and K in the timing diagram are low level voltages in the range of the output of power supply 602 in FIG. 6. According to one aspect, the voltages H, I, J and K in FIG. 8 are within the range of +15 volts to −15 volts.

The voltages at node A are typically within the range of 0 to 170 volts DC for an AC supply of 120 volts RMS. The waveform at node A in FIG. 8 provides a timing reference for the timing diagram. The comparator circuit and threshold circuit 714 (FIG. 7) selects only the peak pulses 810, 812, based on pulse amplitude, for synchronization of the phase recovery circuit 702. The second ramp generator 738 (FIG. 7) generates a sawtooth voltage waveform at node H. The sawtooth voltage waveform at node H includes an undesired DC offset 814 of an unpredictable magnitude. The offset-free filter 708 (FIG. 7) receives the sawtooth voltage waveform at node H and provides an offset-free sawtooth waveform 816 at Node I that has substantially equal positive and negative peaks. The absolute value circuit 710 receives the offset-free sawtooth waveform 816 at node I and provides an absolute value waveform 818 at node J. The absolute value waveform 818 at node J includes an undesired transient pulse 820. The low pass filter 712 receives the absolute value waveform 818 at node J and provides a triangle wave 822 at node K that is a phase control output that is substantially free of the undesired transient pulse 820.

Referring now the voltage at node K with respect to an AC power waveform 824, it can be seen by inspection of FIG. 8 that the triangle wave provides a phase control output at node K that comprises a monotonic function of an absolute value of the applied AC power. The triangle wave at node K crosses any intermediate voltage band 826 a total of four (4) times per full cycle of the AC power waveform 824. The phase control output at node K is thus a phase reference that can synchronize switching with AC power waveform voltage levels.

Figure 9:
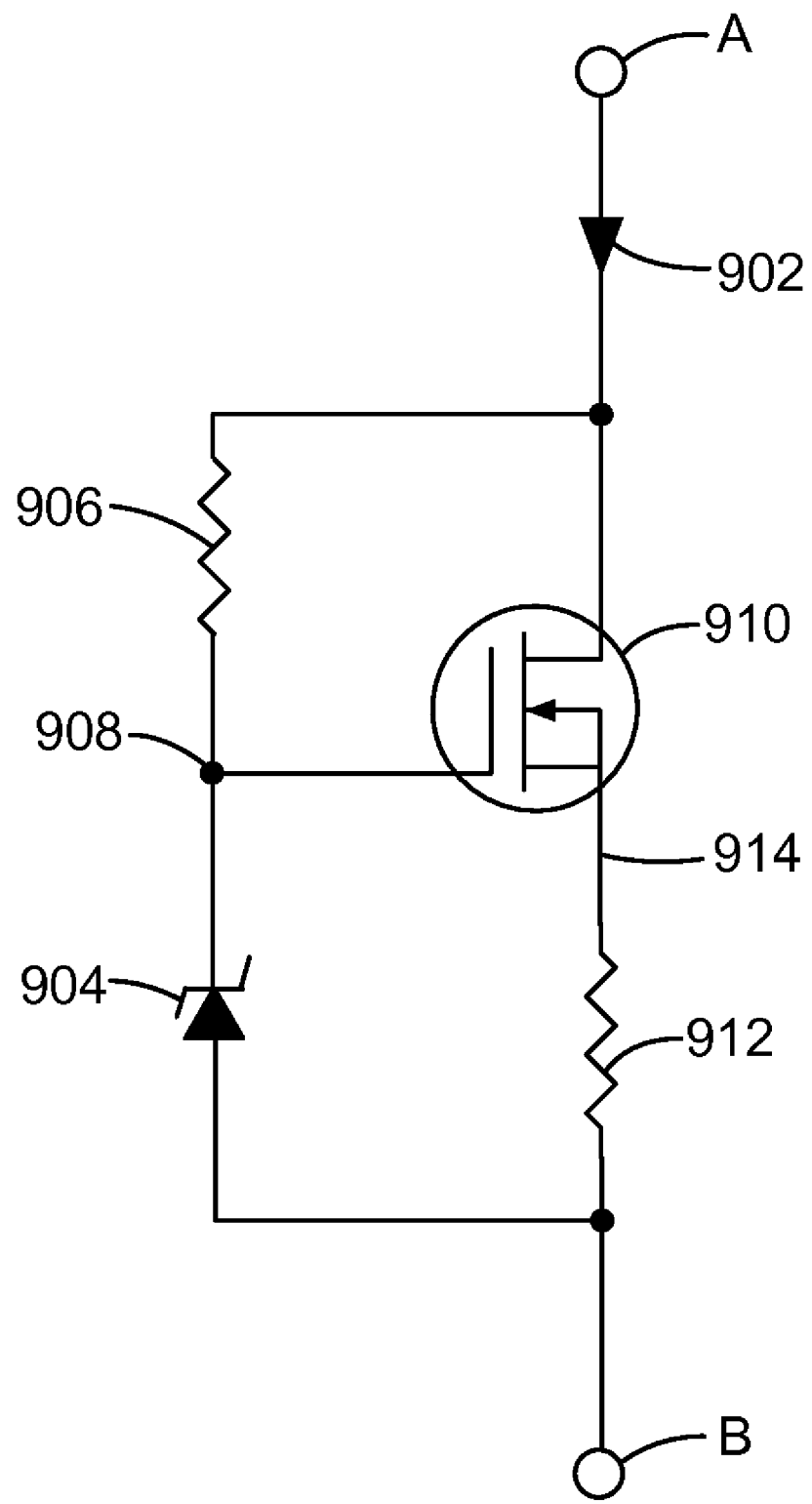
FIG. 9 illustrates a schematic diagram of a bleed circuit.

FIG. 9 illustrates an exemplary schematic diagram of the bleed circuit 628 illustrated in FIG. 6. The bleed circuit 608 couples between nodes A and B and, when energized, conducts a substantially constant bleed current 902 from the rectified power output. The bleed 628 comprises a Zener diode 904 that is biased by a resistor 906 that together provide a reference voltage 908 to a gate input of a transistor 910. The transistor 910 conducts current from node A to node B through a resistor 912. The resistor 912 provides a feedback voltage 914 to the transistor 910 that sets an operating point for transistor 910 at a substantially fixed current drawn from the rectified power output at nodes A and B. Use of the bleed circuit 628 ensures that an effective capacitance Ceff between node A and B is discharged at all times and especially during the peak interval of the AC power. In order for optimal bleed, a bleed current Ib exceeds a product of the effective capacitance Ceff times a line voltage rate of change (dV/dt) at zero crossing. For 60 Hz 120 VAC RMS line power, for example, (dV/dt) is maximally 65 kV/s. According to one aspect a bleed current Ib of 13 mA is able to adequately discharge a capacitance Ceff of 150 nanofarads.

FIG. 10 illustrates an exemplary schematic diagram of the comparator circuit 1002 and threshold 1004. The comparator circuit 1002 is coupled to the rectified power output at nodes A and B. The comparator circuit 1002 comprises a transistor 1008 and a resistor 1010 that are coupled in series with a parallel combination of a Zener diode 1012 and a storage capacitor 1014. As the voltage at node A increase, current flows through the transistor 1008 and the resistor 1010 to charge up the storage capacitor 1014 to a voltage limited by the Zener diode 1012. According to one aspect, the AC power is provided at 120 VAC RMS, and the Zener diode 1012 has a Zener voltage of 150 volts DC. The Zener voltage is selected to exceed the amplitude of flank pulses, and to be within the range of the peak pulses. In one example, for AC power at 120 VAC RMS, peak pulses reach approximately 169 volts DC, which is adequate to charge the storage capacitor 1014 to 150 volts DC. Each time the rectified power output at node A exceeds the Zener voltage during the pulse interval, the transistor 1008 is switched on and conducts a current pulse through a resistor 1016 to an input (pin 1) of an optical coupler 1018. An output (pin 7) of the optocoupler 1018 provides an output pulse at node C for each current pulse through the resistor 1016. A resistor 1020 serves as a pull-up resistor for the optocoupler output. The voltage waveform at node C is a comparison output and is described in more detail below in connection with a timing diagram in FIG. 13.

Figure 11:
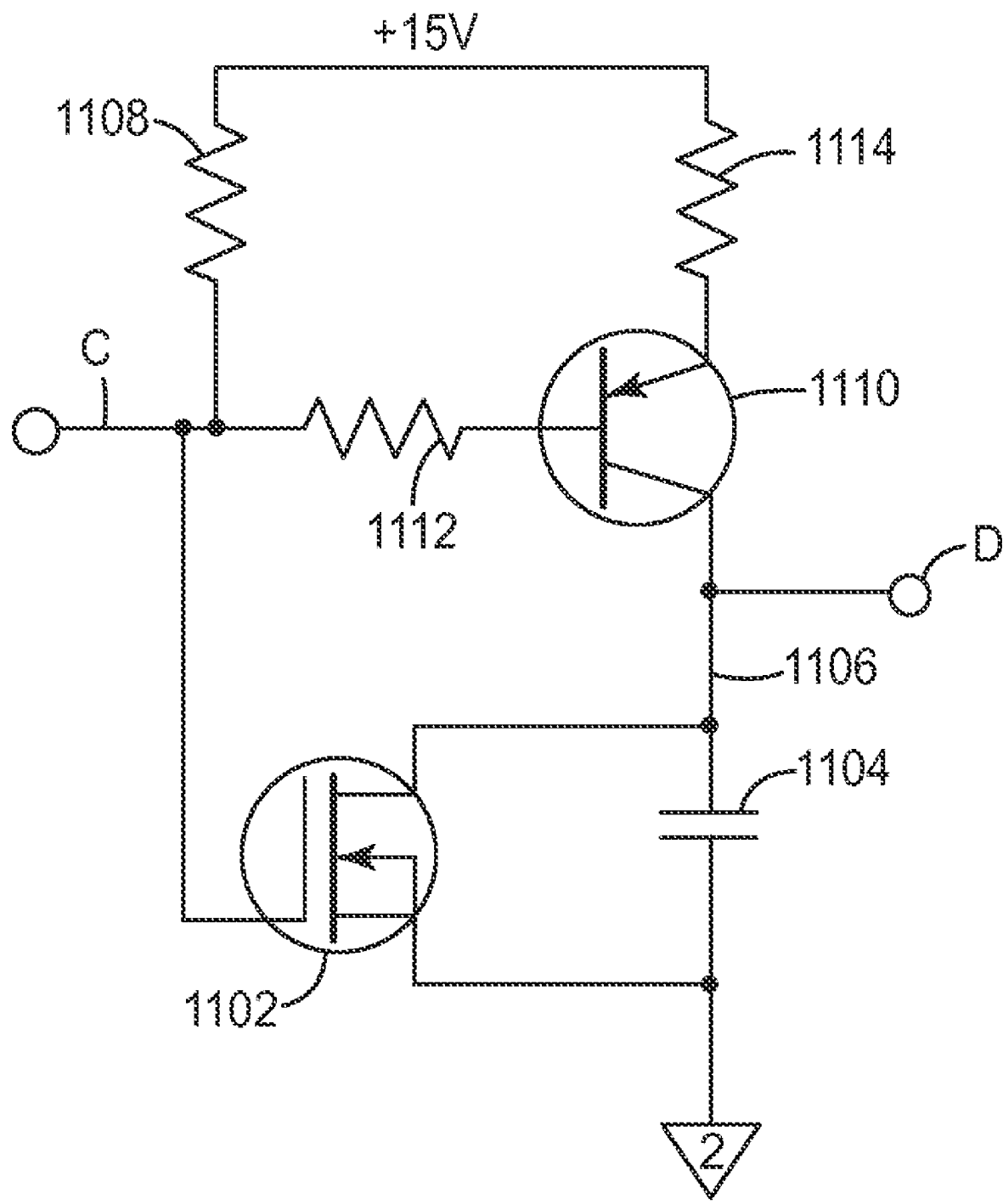
FIG. 11 illustrates a schematic diagram of a rectified peak ramp generator circuit.

FIG. 11 illustrates an exemplary schematic diagram of the rectified peak ramp generator circuit 718 shown in FIG. 7. The rectified peak ramp generator 718 generates a ramp during peak intervals at node D as described in more detail below in connection with a timing diagram in FIG. 13. The rectified peak ramp generator 718 comprises a transistor 1102 that has its output connected in parallel with a capacitor 1104. An input of transistor 1102 is coupled to node C. During flank intervals, the voltage at node C is high, and the transistor 1102 is switched on, keeping the capacitor 1104 discharged. A voltage 1106 of the capacitor 1104 is coupled to node D. A pull-up resistor 1108 coupled to the input of transistor 1102 ensures that the transistor is switched on during startup and shut down of the associated circuitry. During a pulse interval, the voltage at node C is low, transistor 1102 is switched off, and transistor 1110 is switched on by a bias current from node C through resistor 1112 to an input of transistor 1110. During the peak interval, the capacitor 1104 is charged by a current flowing through the transistor 1110 and a resistor 1114. The resistor 1112 limits the rate of charging of the capacitor 1104 to an approximate ramp as illustrated at node D in the timing diagram in FIG. 13.

Figure 12:
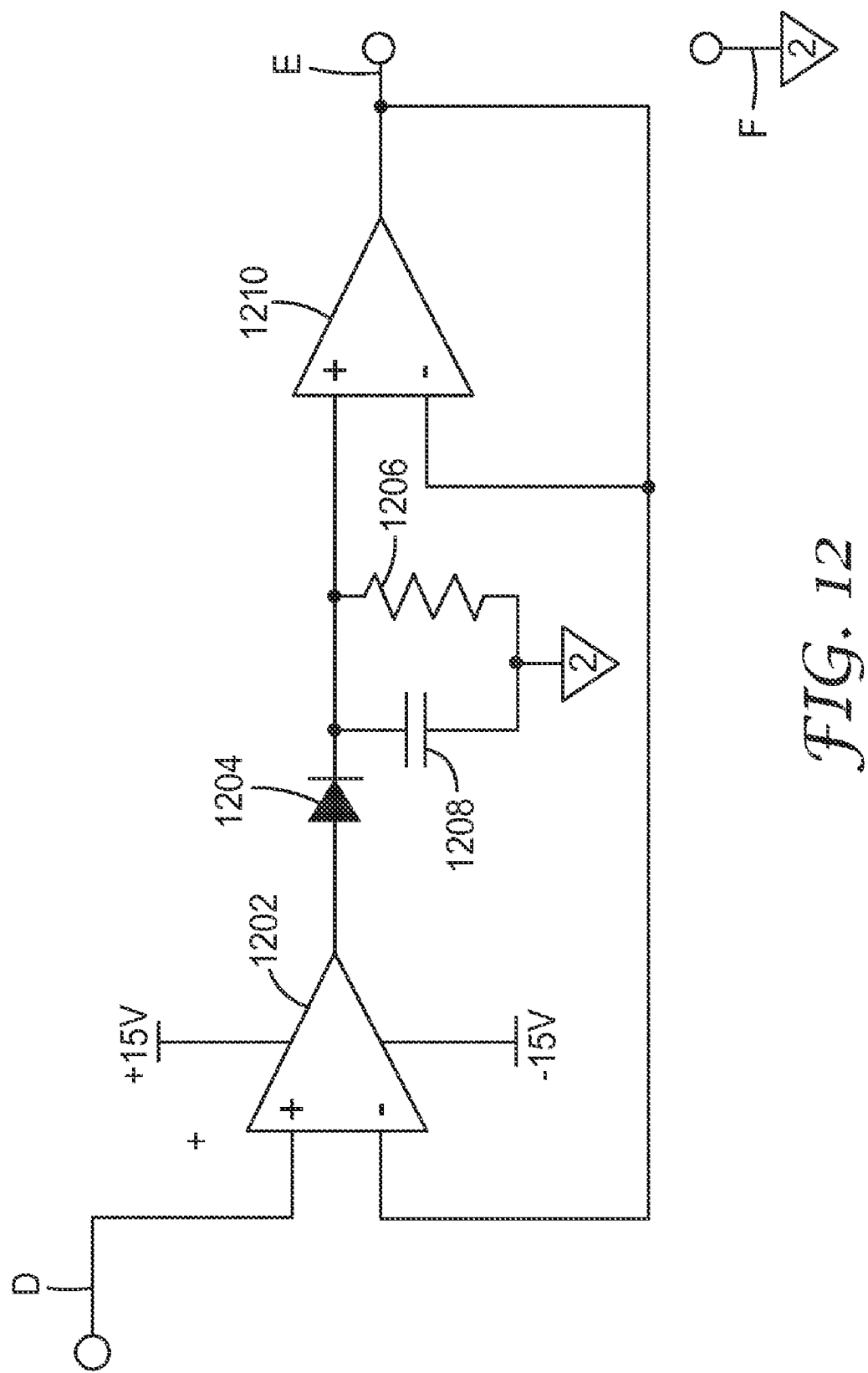
FIG. 12 illustrates a schematic diagram of a rectified peak detector circuit.

FIG. 12 illustrates an exemplary schematic diagram of the rectified peak detector circuit 722 in FIG. 7. The rectified peak detector circuit 722 comprises a first amplifier 1202 that has a non-inverting input that receives the rectified peak ramp at node D. The first amplifier 1202 has a first amplifier output that is coupled through a diode 1204 to an RC network that includes resistor 1206 and a capacitor 1208. The RC network coupled to a non-inverting input of a second amplifier 1210. An output of the second amplifier 1210 couples back to an inverting input of the second amplifier 1210, forming a unity gain buffer circuit. The output from the second amplifier 1210 couples back to an inverting input of the first amplifier 1202.

Figure 13:
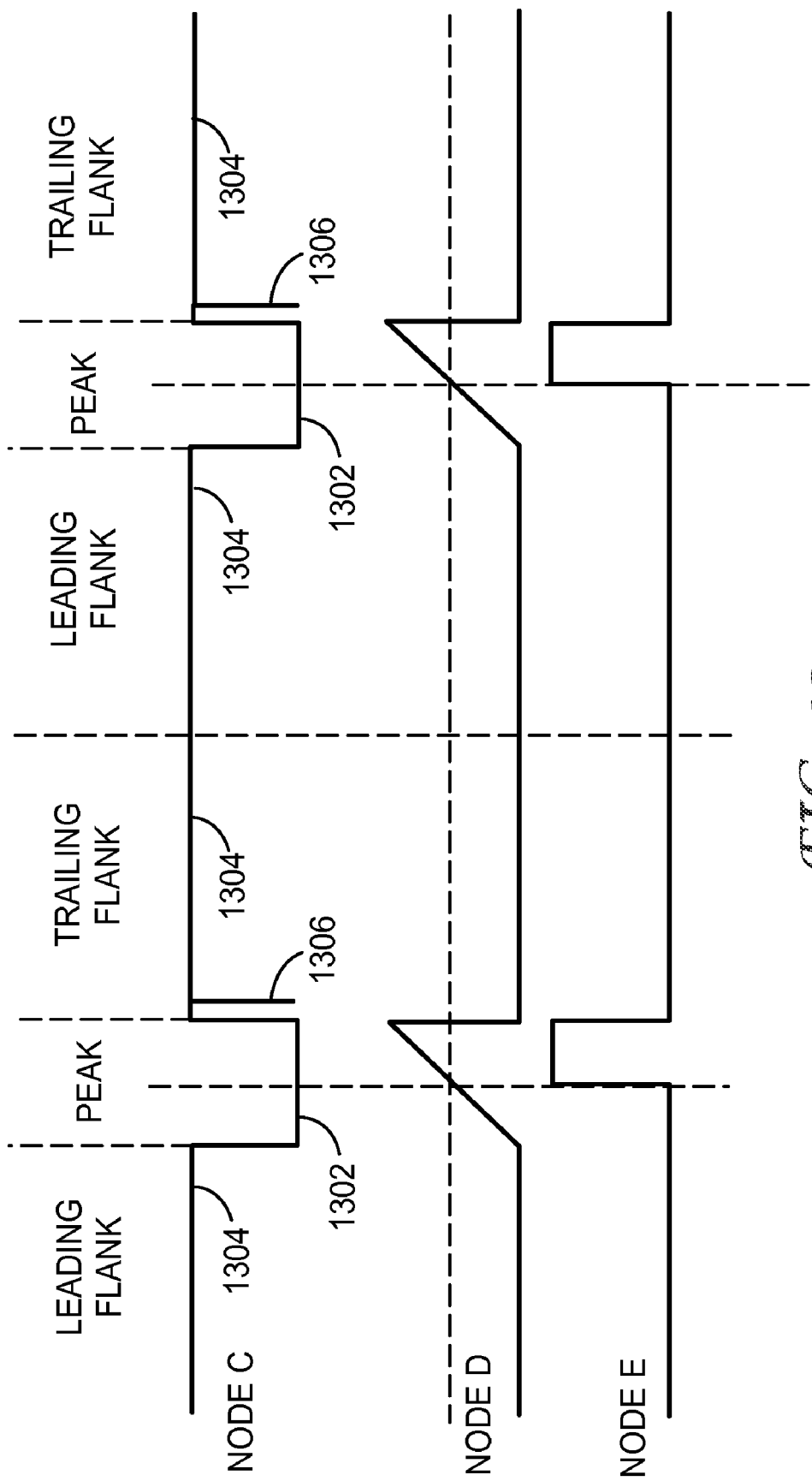
FIG. 13 illustrates a timing diagram for the circuitry of FIGS. 11 and 12.

During flank intervals, the input at node D is substantially zero volts as illustrated in the timing diagram in FIG. 13. During flank intervals, the resistor 1206, which is connected to common, biases the non-inverting input of amplifier 1210 to substantially zero volts. The output of amplifier 1210 is substantially at zero volts. Both inputs of amplifier 1202 are at zero volts, and the output of amplifier 1202 is at zero volts.

At the start of a peak interval, the voltage at node D starts to rise, and the voltage at the output of amplifier 1202 increases from zero to approximately +15 volts. Current flow through the diode 1204, charging the capacitor 1208, which functions as an integrator. The voltage at the output of amplifier 1210 (node E) increases, starting the output pulse on node E as illustrated in the timing diagram in FIG. 13.

FIG. 13 illustrates an exemplary timing diagram of voltages at nodes C, D and E in FIGS. 11-12. The waveforms are initiated or triggered by pulses 1302 during pulse intervals. During flank intervals, there is a possibility of a switching transient 1306 in the voltage at node C. As illustrated at node D, the voltage waveform is an integrator ramp, and because of the narrow width of the switching transients 1306, the switching transients 1306 have no effect on the integrator ramp at node D. The rectified peak ramp generator in FIG. 11 as a result filters out narrow width switching transients.

Figure 14:
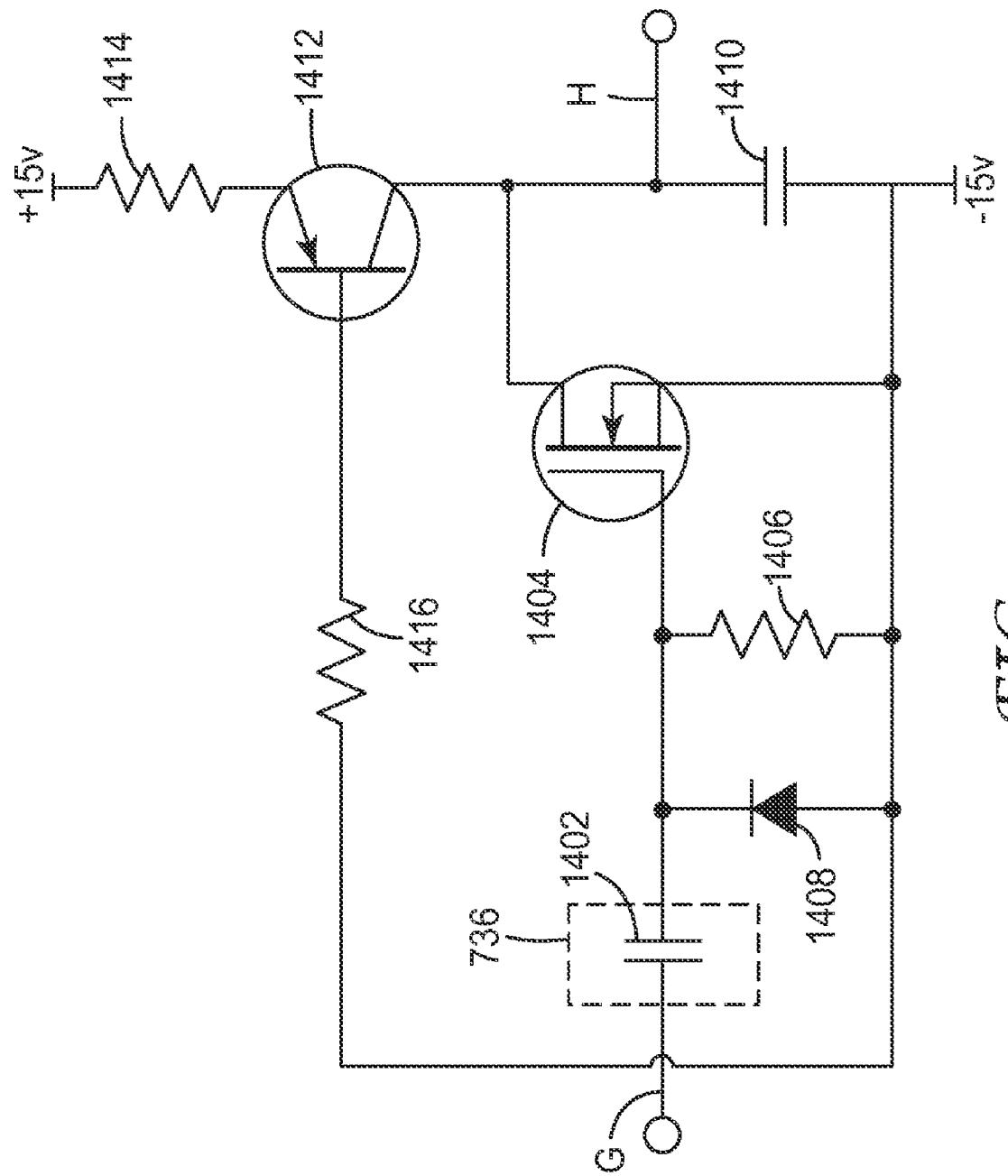
FIG. 14 illustrates a schematic diagram of a differentiator and second ramp generator circuit.

FIG. 14 illustrates an exemplary schematic diagram of the differentiator 736 and second ramp generator circuit 738 in FIG. 7. The differentiator 736 comprises the capacitor 1402 and resistor 1406. This RC combination differentiates the output at node G at the output of the amplifier 732 in FIG. 7. The differentiated output from the capacitor 1402 couples to an input of a transistor 1404. Resistor 1406 also provides a DC bias to the input of the transistor 1404. A diode 1408 clamps the input voltage of transistor 1404 to limit negative voltages. An output of the transistor 1404 is coupled in parallel with a capacitor 1410. The combination of the differentiator 736 and the transistor 1404 forms a circuit that is used to reset the voltage on capacitor 1410 to zero at the beginning of each half cycle of the AC power coinciding with the rising edge of node E in FIG. 13. After the voltage on capacitor 1410 is reset to zero, a transistor 1412 and resistors 1414, 1416 provide a charging current to the capacitor 1410, the charging current produces a ramp voltage on the capacitor 1410. The combination of resetting the voltage and the ramp voltage results in a sawtooth waveform at node H as described above in connection with the timing diagram in FIG. 8.

Figure 15:
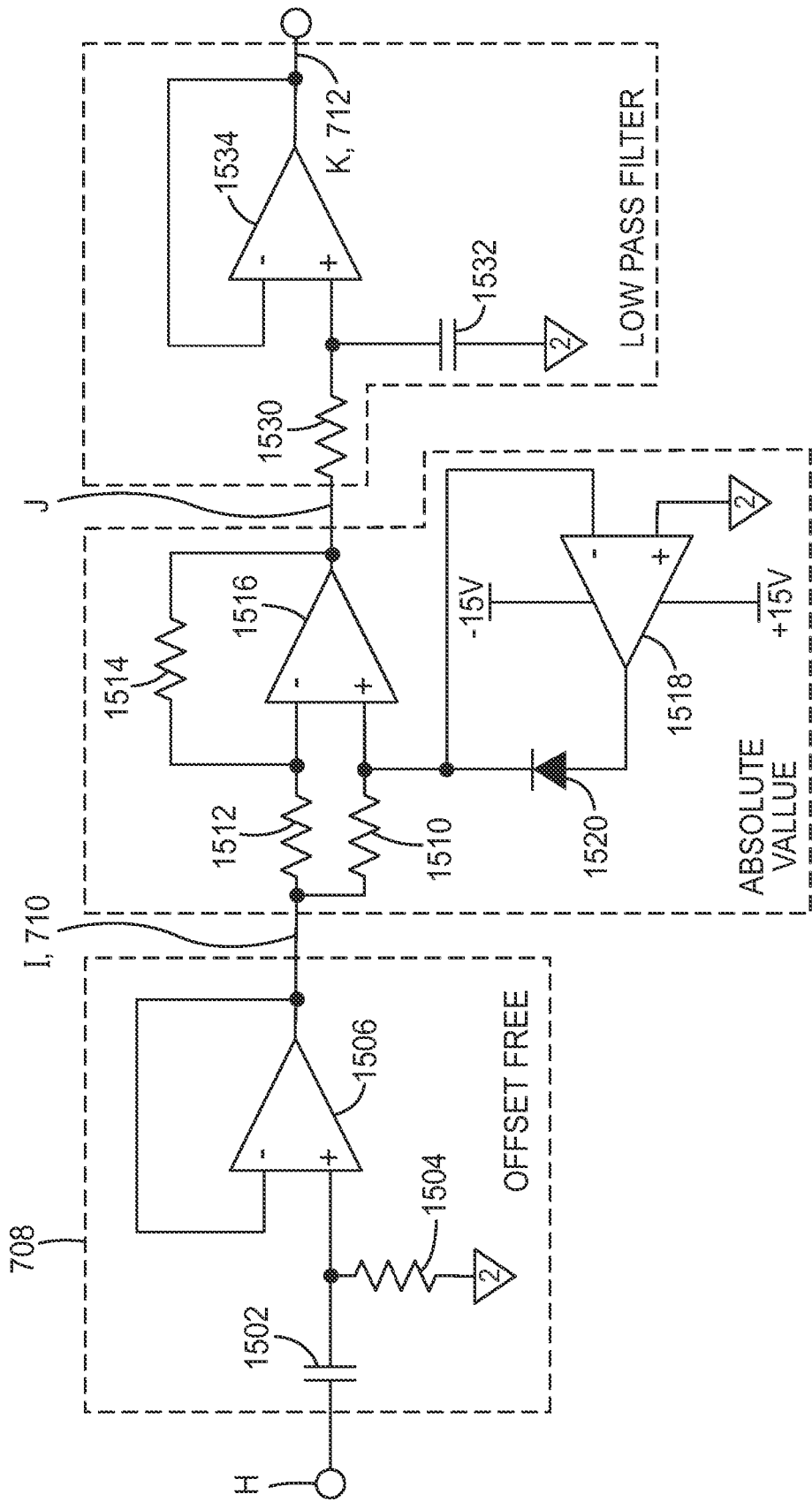
FIG. 15 illustrates a schematic diagram of an offset free filter, absolute value circuit and low pass filter circuit.

FIG. 15 illustrates an exemplary schematic diagram of the offset free filter 708, the absolute value circuit 710 and low pass filter circuit 712 that are described above in connection with FIGS. 7 and 8. The offset free filter 708 comprises a capacitor 1502, a resistor 1504 and an amplifier 1506 which is connected as a unity gain buffer amplifier. The absolute value circuit 710 comprises resistors 1510, 1512, 1514, amplifiers 1516, 1518 and a diode 1520. The low pass filter 712 comprises a resistor 1530, a capacitor 1532 and an amplifier 1534. The absolute value operation results in the transient 820 in FIG. 8.

Figure 16:
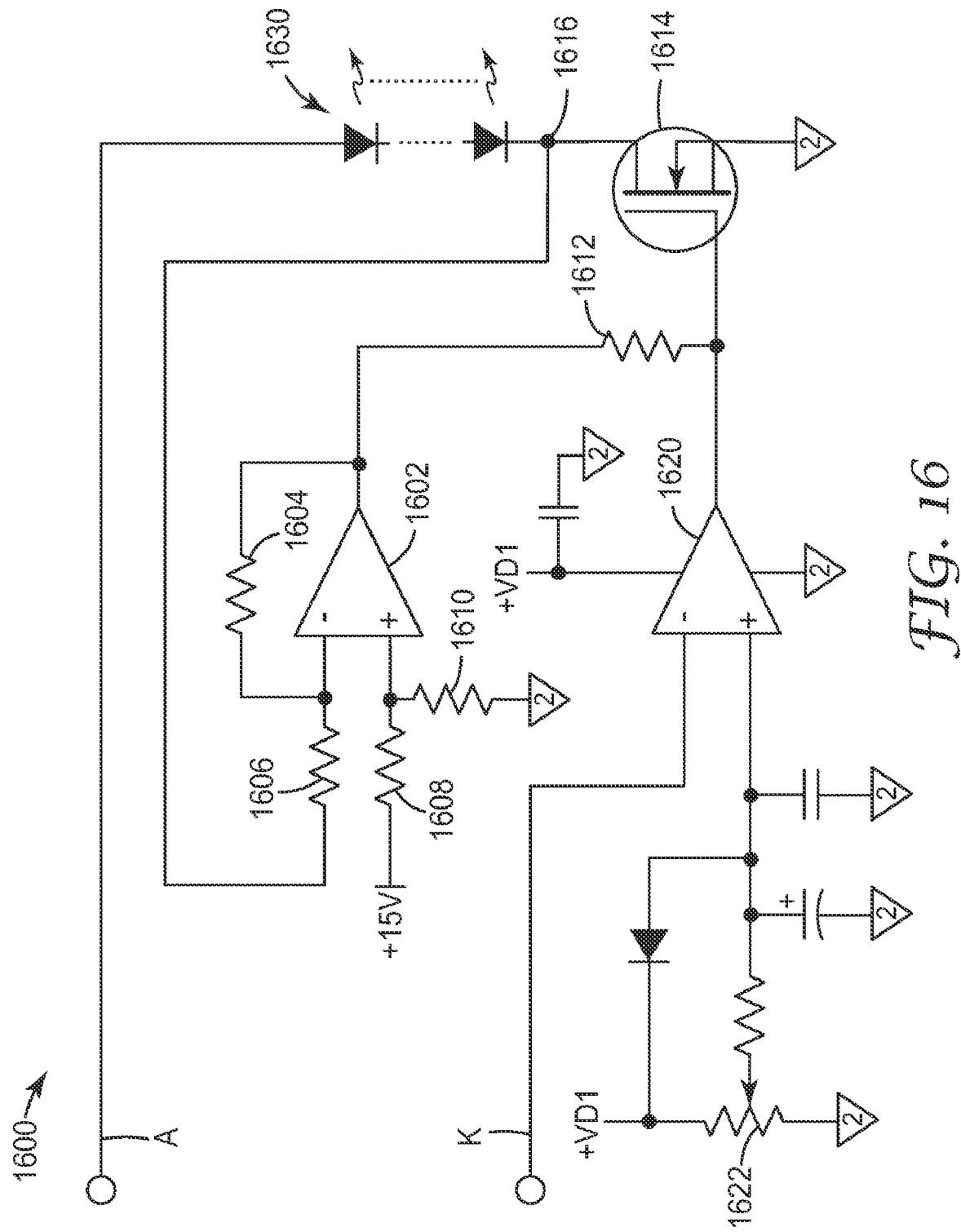
FIG. 16 illustrates a schematic of a phase controlled timing circuit.

FIG. 16 illustrates an exemplary partial schematic of a phase controlled timing circuit 1614 described above in connection with FIG. 6. FIG. 16 shows an exemplary one of three color channels 1, 2, 3 for three different light colors (such as red, green and blue, for example).

The color channel 1600 shown in FIG. 16 receives the phase control output at node K in FIG. 16. The phase control output at node K is also illustrated in the timing diagram in FIG. 8. The color channel comprises an amplifier 1602 and resistors 1604, 1606, 1608, 1610, 1612 that provide a bias voltage to an input of a switch transistor 1614 that primarily depends on the voltage at the non-inverting input of 1602. The voltage at the inverting input of 1602 is derived from the drain voltage at 1616 to help shut down transistor 1614 in an excessive supply (spike) voltage situation. The color channel includes an amplifier 1620 that receives the phase control output at an inverting input and that receives an adjustment setting from a potentiometer 1622 that is set to the desired range for the color on channel 1600. The setting of the potentiometer 1622 is set to permit the transistor 1614 to be enabled to switch on when the phase control output is in the range set by the potentiometer 1622. When switched AC power envelope is applied at node A and also the phase control output is in the correct phase range, then the string of solid state light emitting devices 1630 is turned on, but only for so long as specified by the dimmer setting of the pulse width of the flank pulse for color 1. The number of light emitting devices in the string 1630 is selected to match the voltage available for the phase range.

Figure 17:
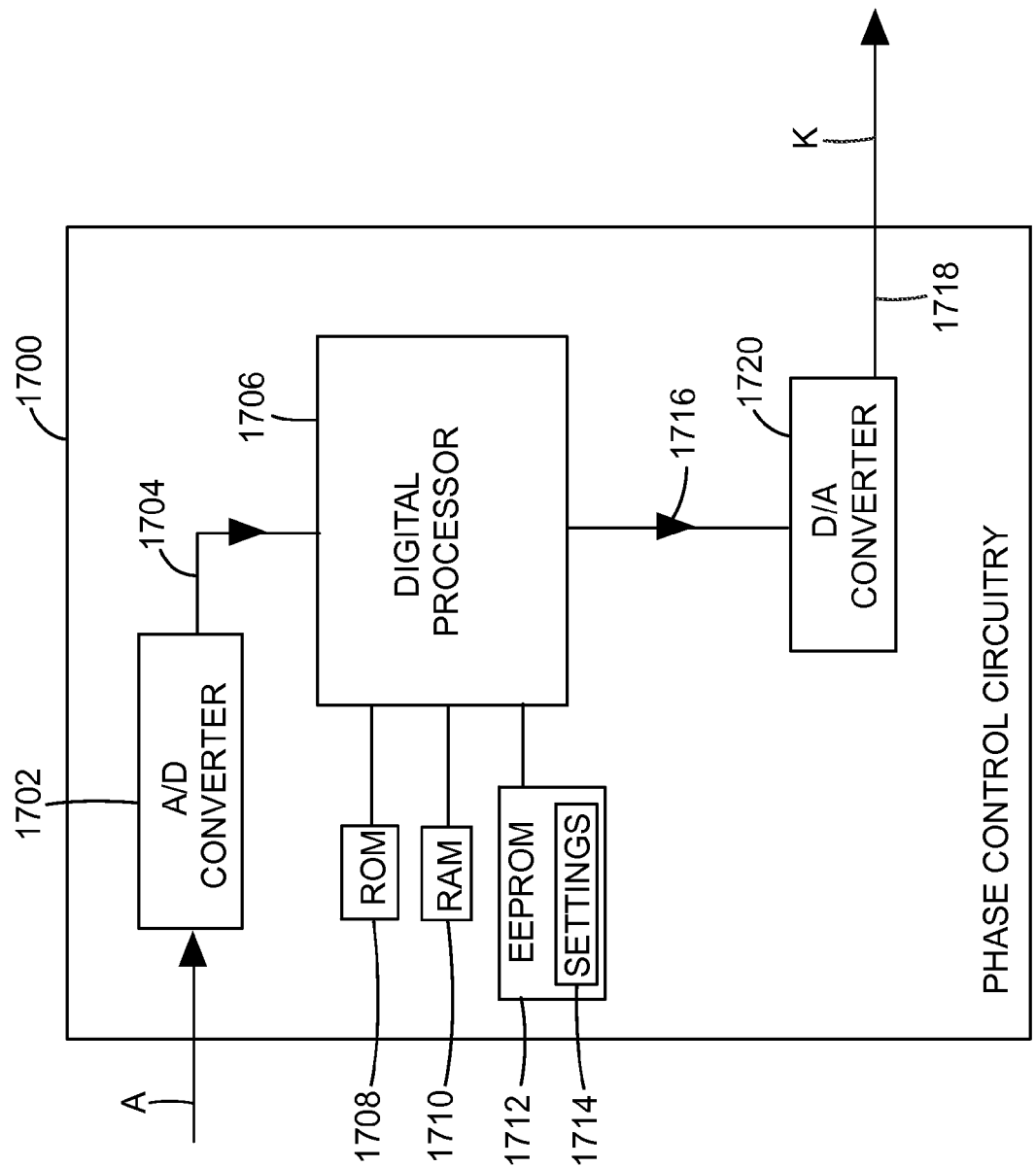
FIG. 17 illustrates a block diagram of phase recovery circuit that includes a digital processor.

FIG. 17 illustrates an exemplary block diagram of an alternative embodiment of phase control circuitry 702 in FIG. 7 or of circuitry 410 in FIG. 4 that includes a digital processor. In FIG. 17, phase control circuitry 1700 comprises an analog to digital (A/D) converter 1702 that is couplable to node A (FIG. 7) or to line 406 (FIG. 4) to digitize the rectified AC signal or a replica thereof. The A/D converter provides a digital output 1704 that comprises a stream of digital data representative of the rectified AC signal at node A or at line 406.

The phase control circuitry 1700 comprises a digital processor 1706. The phase control circuitry 1700 comprises read only (program) memory (ROM) 1708, random access memory (RAM) 1710 and electrically erasable programmable read only memory (EEPROM) 1712 that are coupled to the digital processor 106. Settings 1714 are stored in the EEPROM 1712. The digital processor 1706 provides a digital output 1716. The digital output 1716 comprises a stream of digital data representative of a phase control output 1718 at node K.

The phase control circuitry 1700 comprises a digital to analog (D/A) converter 1720. The digital to analog converter 1720 converts the stream of digital data representative of the phase control output K to the phase control output K which is an analog signal.

The digital processor 1706 performs calculation of the digital data representative of the phase control output K as a function of the digital data representative of the AC signal at node A or at line 406. According to one aspect, the digital processor 1706 also performs additional calculations that replace other portions of the circuitry of an illumination apparatus.

Figure 18:
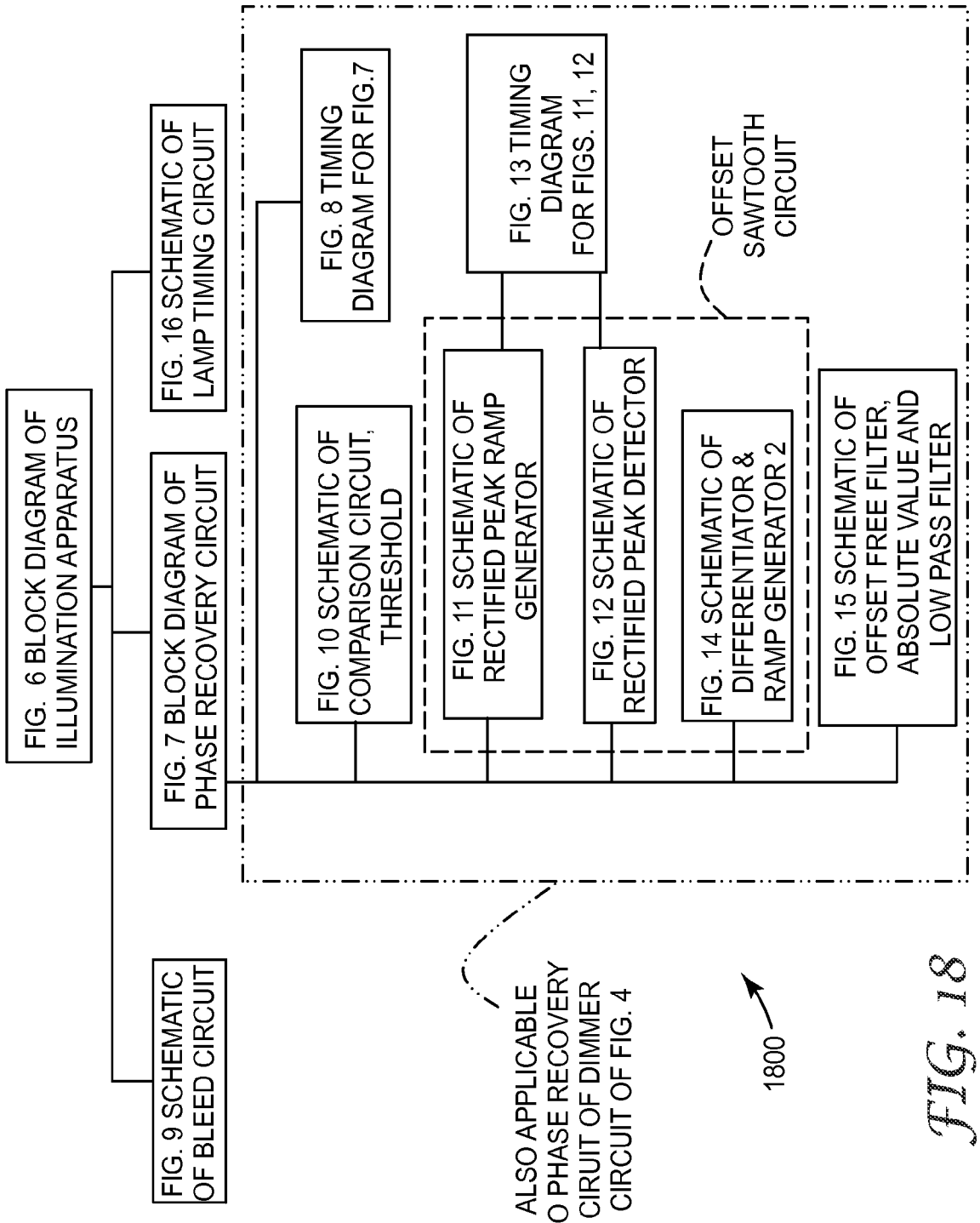
FIG. 18 illustrates hierarchical relationships of the drawing FIGS. 6-16 with one another.

FIG. 18 illustrates relationships of the various drawing FIGS. 6-16 with one another. It is understood that the schematics of FIGS. 9-16 and the timing diagrams of FIGS. 8, 13 are exemplary, and that other schematics and timing diagrams can also be used in the block diagrams of FIGS. 4, 6 and 7.

Although the present invention has been described with reference to preferred embodiments, workers skilled in the art will recognize that changes may be made in form and detail without departing from the scope of the invention.

What is claimed is:
1. An illumination apparatus, comprising:
a rectifier that receives power from a switched AC power envelope and that provides a rectified power output that has a peak interval and flank intervals;
a phase recovery circuit that comprises:
a comparison circuit that compares the rectified power output to a threshold and that provides a comparison output that has a first level during the peak interval and a second level during the flank intervals;
phase control circuitry that generates a phase control output synchronized to the comparison output;
a timing circuit that receives the phase control output and that actuates multiple switches in order during the flank intervals in synchronization with the phase control output; and
multiple strings of multiple color light emitting devices coupled through the multiple switches to the rectified power output.
2. The illumination apparatus of claim 1 wherein the phase control output comprises a triangular waveform that has an amplitude representative of an absolute value of the AC power envelope.
3. The illumination apparatus of claim 1 wherein each of the multiple strings of color light emitting devices has a voltage drop that corresponds with absolute values of the AC power envelope during the flank intervals in which each of the multiple strings is energized.
4. The illumination apparatus of claim 3 wherein the multiple switches comprise current limiting switches.
5. The illumination apparatus of claim 1 wherein the phase control circuitry comprises:
an offset sawtooth circuit that receives the comparator output and that generates an offset sawtooth voltage that comprises a DC offset;
a filter that receives the offset sawtooth voltage and that generates an offset-free sawtooth voltage;
an absolute value circuit that receives the offset-free sawtooth voltage and that generates a triangular absolute value voltage; and
a low pass filter that receives the triangular absolute value voltage and that provides the phase control output.
6. The illumination apparatus of claim 1 and further comprising:
a bleed circuit coupled to the rectified power output.
7. The illumination apparatus of claim 1 and further comprising:
an optical mixing cavity that directs light received from the multiple strings and provides a mixed illumination output.
8. A dimmer, comprising:
a rectifier that is couplable to AC power and that provides a rectified power output;
a phase recovery circuit that comprises:
a comparison circuit that compares the rectified power output to a threshold and that provides a comparison output that has a first level during a peak interval and a second level during flank intervals;
phase control circuitry that generates a phase control output synchronized to the comparison output;
a timing circuit that receives the phase control output and that actuates a dimmer switch circuit in order during the flank intervals in synchronization with the phase control output; and
user setting inputs coupled to the timing circuit that set amplitude levels of actuation of the dimmer switch circuit during the flank intervals.

9. The dimmer of claim 8 wherein the actuation of the dimmer switch circuit during flank intervals generates a switched AC power envelope.

10. The dimmer of claim 8 wherein the phase control output comprises a triangular waveform that has an amplitude representative of an absolute value of the AC power envelope.

11. The dimmer of claim 8 wherein the user settings adjust light color settings.

12. The dimmer of claim 8 wherein the phase recovery circuit comprises:
- a circuit that receives the rectified power output and that generates an offset sawtooth voltage that comprises a DC offset;
- an offset-free filter that receives the offset sawtooth voltage and that generates an offset-free sawtooth voltage;
- an absolute value circuit that receives the offset-free sawtooth voltage and that generates a triangular absolute value voltage; and
- a low pass filter that receives the triangular absolute value voltage and that provides the phase control output.

13. The dimmer of claim 8 wherein the dimmer output comprises a two wire circuit.

14. The dimmer of claim 8 wherein the dimmer switch circuit comprises a solid state switch circuit.

15. A method, comprising:
- rectifying power received from a switched AC power envelope and providing a rectified power output that has a peak interval and flank intervals;
- recovering phase by:
  - comparing the rectified power output to a threshold and providing a comparison output that has a first level during the peak interval and a second level during flank intervals;
  - generating a phase control output synchronized to the comparison output;
- actuating multiple switches in order during the flank intervals in synchronization with the phase control output; and
- providing multiple strings of multiple color light emitting devices coupled through the multiple switches to the rectified power output.

16. The method of claim 15 and further comprising:
- providing the phase control output with a triangular waveform that has an amplitude representative of an absolute value of the AC power envelope.

17. The method of claim 15 wherein generating the phase recovery output comprises:
- generating a train of main pulses with duration substantially equal to a duration of the peak interval;
- excluding spurious pulses during the flank intervals from this train;
- generating a trigger pulse whose leading edge substantially coincides with a center of the peak interval;
- receiving the trigger pulse and generating an offset sawtooth voltage that comprises a DC offset;
- receiving the offset sawtooth voltage and generating an offset-free sawtooth voltage;
- receiving the offset-free sawtooth voltage and generating a triangular absolute value voltage; and
- low pass filtering the triangular absolute value voltage and providing the phase control output.

18. The method of claim 15 and further comprising: bleeding current from the rectified power output.

19. The method of claim 18 wherein the bleeding comprises a current limited bleeding.

20. The method of claim 15 and further comprising:
- directing light received from the multiple strings to a mixing cavity and providing a mixed illumination output from the mixing cavity.

* * * * *